US010223144B2

(12) United States Patent
Kano et al.

(10) Patent No.: US 10,223,144 B2
(45) Date of Patent: Mar. 5, 2019

(54) METHOD AND APPARATUS OF REDUNDANT PATH VALIDATION BEFORE PROVISIONING

(71) Applicant: HITACHI, LTD., Chiyoda-ku, Tokyo (JP)

(72) Inventors: Yoshiki Kano, Bellevue, WA (US); Dan Ritchie, Issaquah, WA (US); Randy Chong, Monroe, WA (US); Abid Masood, Bellevue, WA (US)

(73) Assignee: Hitachi, Ltd., Tokyo (JP)

( * ) Notice: Subject to any disclaimer, the term of this patent is extended or adjusted under 35 U.S.C. 154(b) by 209 days.

(21) Appl. No.: 14/993,186

(22) Filed: Jan. 12, 2016

(65) Prior Publication Data

US 2016/0127472 A1 May 5, 2016

Related U.S. Application Data

(63) Continuation of application No. 13/560,139, filed on Jul. 27, 2012, now Pat. No. 9,354,915.

(51) Int. Cl.
G06F 15/173 (2006.01)
G06F 9/455 (2018.01)
(Continued)

(52) U.S. Cl.
CPC .......... G06F 9/45558 (2013.01); G06F 3/067 (2013.01); G06F 3/0619 (2013.01);
(Continued)

(58) Field of Classification Search
CPC .. G06F 9/45558; G06F 3/0619; G06F 3/0665; G06F 3/0635; H04L 49/356; H04L 49/552; H04L 12/467
(Continued)

(56) References Cited

U.S. PATENT DOCUMENTS 6,928,484 B1 8/2005 Huai et al.
7,243,160 B2 7/2007 Brahmaroutu
(Continued)

FOREIGN PATENT DOCUMENTS

JP 2006-209487 A 8/2006
JP 2011-3208 A 1/2011
(Continued)

OTHER PUBLICATIONS

Sanaswati, HDS—Allocate the storage to new hosts using Storage Navigator, Mar. 7, 2012, www.sanspire.com, http://www.sanspire.com/hds-allocate-the-storage-to-new-hosts-using-storage-navigator/.*

(Continued)

Primary Examiner — Emmanuel L Moise
Assistant Examiner — Zi Ye
(74) Attorney, Agent, or Firm — Mattingly & Malur, PC

(57) ABSTRACT

Exemplary embodiments of the invention provide a technique to validate physical cabling and logical path before provisioning volume. In accordance with an aspect, a computer comprises a memory storing software and a processor executing the software. The software is operable to: identify first server port and second server port forming redundant ports of a server and first storage port and second storage port forming redundant ports of a storage system; and check whether a redundant relationship is formed by at least one of (i) a physical connection between the first server port and the first storage port and a physical connection between the second server port and the second storage port, or (ii) a logical connection between the first server port and the first storage port and a logical connection between the second server port and the second storage port.

6 Claims, 33 Drawing Sheets

(51) Int. Cl.
*G06F 3/06* (2006.01)
*H04L 12/46* (2006.01)
*H04L 12/931* (2013.01)
*H04L 29/08* (2006.01)
*H04L 12/939* (2013.01)
*H04L 12/24* (2006.01)
*G06F 11/20* (2006.01)

(52) U.S. Cl.
CPC .......... *G06F 3/0635* (2013.01); *G06F 3/0665* (2013.01); *H04L 12/467* (2013.01); *H04L 49/356* (2013.01); *H04L 49/552* (2013.01); *H04L 67/1097* (2013.01); *G06F 3/0605* (2013.01); *G06F 3/0617* (2013.01); *G06F 3/0632* (2013.01); *G06F 11/2007* (2013.01); *G06F 2009/45579* (2013.01); *H04L 41/0853* (2013.01); *H04L 41/0873* (2013.01)

(58) Field of Classification Search
USPC .......................................... 709/223; 370/216
See application file for complete search history.

(56) References Cited

U.S. PATENT DOCUMENTS

| | | | |
|---|---|---|---|
| 7,398,421 B1* | 7/2008 | Limaye | H04L 69/40 714/16 |
| 7,406,039 B2 | 7/2008 | Cherian et al. | |
| 7,617,320 B2 | 11/2009 | Alon et al. | |
| 7,693,158 B1 | 4/2010 | Carrie | |
| 7,706,286 B2 | 4/2010 | Karloff | |
| 7,990,994 B1* | 8/2011 | Yeh | H04L 12/4641 370/431 |
| 8,700,811 B2 | 4/2014 | Oshins et al. | |
| 2003/0195956 A1* | 10/2003 | Bramhall | G06F 3/0601 709/223 |
| 2006/0047850 A1 | 3/2006 | Singh Bhasin et al. | |
| 2006/0146694 A1* | 7/2006 | Hamaguchi | H04L 67/1097 370/216 |
| 2006/0174087 A1 | 8/2006 | Hashimoto et al. | |
| 2008/0114955 A1* | 5/2008 | Kitayama | G06F 3/0605 711/163 |
| 2009/0222733 A1 | 9/2009 | Basham et al. | |
| 2010/0070722 A1 | 3/2010 | Otani et al. | |
| 2011/0004708 A1 | 1/2011 | Kondo et al. | |
| 2011/0106923 A1* | 5/2011 | Bethune | H04L 41/0893 709/221 |
| 2012/0051232 A1 | 3/2012 | Nomura | |

FOREIGN PATENT DOCUMENTS

JP 2011-14088 A 1/2011
JP 2012-49725 A 3/2012

OTHER PUBLICATIONS

Japanese Office Action received in corresponding Japanese Application No. 2013-042617 dated Nov. 1, 2016.

\* cited by examiner

| Name (3001) | UUID (3002) | MGMT IP Address (3003) | Port # (3004) | WWN (3005) | Reserved (3006) |
|---|---|---|---|---|---|
| server 1 | 150e8400 -e29b- 41d4- a716- 446655440000 | 192.168.1.100 .... | 1 | 50:00:08:70:00:57:34:00 | |
| | | | 2 | 50:00:08:70:00:57:34:11 | |
| | | | 3 | 50:00:08:70:00:57:35:00 | Reserved |
| | | | 4 | 50:00:08:70:00:57:35:11 | Reserved |
| server 2 | 150e8400 -e29b- 41d4- a716- 446655440001 | 192.168.1.101 .... | 1 | 50:00:08:70:00:57:34:02 | |
| | | | 2 | 50:00:08:70:00:57:34:12 | |
| server 3 | 150e8400 -e29b- 41d4- a716- 446655440003 | 192.168.1.102 .... | 1 | 50:00:08:70:00:57:34:03 | |
| | | | 2 | 50:00:08:70:00:57:34:13 | |
| .... | ... | .... | ... | .... | |
| .... | ... | .... | ... | .... | |

Fig. 3

| Name(4001) | IP Address (4002) | Domain ID (4003) |
|---|---|---|
| CoreSwitch1 | 192.167.1.1 | 1 |
| CoreSwitch2 | 192.167.1.2 | 2 |
| ToR3 | 192.167.1.3 | 1 |
| ToR4 | 192.167.1.4 | 2 |
| ToR5 | 192.167.1.5 | 1 |
| ... | ... | ... |
| ToR10 | 192.168.1.10 | 4 |
| | | |

Fig. 4

Name(5001) : CoreSwitch1
IP Address(5002).192.167.1.1
Domain ID(5003) :1

| Port # (5011) | Link up/down (5012) | Discovered WWNs (5013) | Reserved (5014) |
|---|---|---|---|
| 1 | Up | 50:06:0E:80:06:CF:72:00 | Active |
| 2 | Up | 50:06:0E:80:06:CF:72:01 | Active |
| 3 | Up | 50:06:0E:80:06:CF:72:02 | Active |
| 4 | Up | 50:06:0E:80:06:CF:72:03 | Active |
| 5 | Up | 50:06:0E:80:06:CF:72:04 | Active |
| 6 | Up | 50:00:08:70:00:57:34:00<br>50:00:08:70:00:57:34:01<br>50:00:08:70:00:57:34:02<br>50:00:08:70:00:57:34:03<br>50:00:08:70:00:57:34:05<br>…: | Active |
| … | … | … | … |
| 10 | Down |  | Reserved |

Fig. 5

Name : Edge3
IP Address: 192.168.1.3
Domain ID: 1

| Port # | Link up/down | Discovered WWNs | Reserved |
|---|---|---|---|
| 1 | Up | 50:00:08:70:00:57:34:00 | Active |
| 2 | Up | 50:00:08:70:00:57:34:01 | Active |
| 3 | Up | 50:00:08:70:00:57:34:02 | Active |
| 4 | Up | 50:00:08:70:00:57:34:03 | Active |
| 5 | Up | 50:00:08:70:00:57:34:04 | Active |
| 6 | Up | 50:06:0E:80:06:CF:72:00<br>50:06:0E:80:06:CF:72:01<br>50:06:0E:80:06:CF:72:02<br>50:06:0E:80:06:CF:72:03<br>50:06:0E:80:06:CF:72:04<br>50:06:0E:80:06:CF:72:05 | Active |
| ... | ... | ... | ... |
| 10 | Down |  | Reserved |

Fig. 6

Domain ID(7001): 1

| Zone# (7002) | Name(7003) | WWNs (7004) |
|---|---|---|
| 1 | Zone1 | 50:00:08:70:00:57:34:00<br>50:06:0E:80:06:CF:72:00 |
| 2 | Zone2 | 50:00:08:70:00:57:34:01<br>50:06:0E:80:06:CF:72:01 |
| 3 | Zone3 | 50:00:08:70:00:57:34:02<br>50:06:0E:80:06:CF:72:02 |
| 4 | Zone4 | 50:00:08:70:00:57:34:03<br>50:06:0E:80:06:CF:72:03 |
| 5 | Zone5 | 50:00:08:70:00:57:34:04<br>50:06:0E:80:06:CF:72:04 |
| ... | | ... |
| | | |

Fig. 7

Name of Storage(8001): Storage1
Storage IP Address(8002): 192.168.1.254

| Port #(8003) | Name (8004) | WWN (8005) | Cluster (8006) | Reserved (8008) |
|---|---|---|---|---|
| 0 | CL1-A | 50:06:0E:80:06:CF:72:00 | 1 | |
| 1 | CL3-A | 50:06:0E:80:06:CF:72:01 | 2 | |
| 2 | CL5-A | 50:06:0E:80:06:CF:72:02 | 1 | |
| 3 | CL7-A | 50:06:0E:80:06:CF:72:03 | 2 | |
| 4 | CL9-A | 50:06:0E:80:06:CF:72:04 | 1 | |
| ... | ... | ... | ...: | |
| 100 | CLX-A | 50:06:0E:80:06:CF:71:02 | 1 | Reserved |
| | | | | |

Fig. 8

| Name | Server UUID | Port # | WWN (NPIV) |
|---|---|---|---|
| VM1 | 150e8400-e29b-41d4-a716-446655440000 | 1 | 50:00:08:70:01:02:03:01 |
| VM1 | ... | 2 | 50:00:08:70:01:02:03:11 |
| VM2 | ... | 1 | 50:00:08:70:01:02:03:02 |
| VM2 | ... | 2 | 50:00:08:70:01:02:03:12 |
| VM3 | .... | 1 | 50:00:08:70:01:02:03:03 |
| VM3 | ... | 2 | 50:00:08:70:01:02:03:13 |
| ... | | ... | ... |
| ... | | ... | ... |

Fig. 14

Name : ToR3
IP Address: 192.168.1.3
Domain ID: 1

| Port # | Link up/down | Discovered WWNs | Reserved |
|---|---|---|---|
| 1 | Up | 50:00:08:70:00:57:34:00 <br> .... <br> 50:00:08:70:01:02:03:01 <br> 50:00:08:70:01:02:03:02 <br> ... | Active |
| 2 | Up | 50:00:08:70:00:57:34:01 <br> ... | Active |
| 3 | Up | 50:00:08:70:00:57:34:02 <br> .... | Active |
| 4 | Up | 50:00:08:70:00:57:34:03 <br> .... | Active |
| 5 | Up | 50:00:08:70:00:57:34:04 <br> .... | Active |
| 6 | Up | 50:06:0E:80:06:CF:72:00 <br> 50:06:0E:80:06:CF:72:01 <br> 50:06:0E:80:06:CF:72:02 <br> 50:06:0E:80:06:CF:72:03 <br> 50:06:0E:80:06:CF:72:04 <br> 50:06:0E:80:06:CF:72:05 | Active |
| ... | ... | ... | ... |
| 10 | Down | | Reserved |

Fig. 15

Domain ID: 1

| Zone# | Name   | Discovered WWNs                                        |
|-------|--------|--------------------------------------------------------|
| 10    | Zone10 | 50:00:08:70:01:02:03:01<br>50:00:08:70:01:02:03:02     |
| 11    | Zone11 | 50:00:08:70:01:02:03:11<br>50:00:08:70:01:02:03:12     |
| 12    | Zone12 | 50:00:08:70:01:02:03:21<br>50:00:08:70:01:02:03:22     |
| 13    | Zone13 | 50:00:08:70:01:02:03:31<br>50:00:08:70:01:02:03:32     |
| 14    | Zone14 | 50:00:08:70:01:02:03:41<br>50:00:08:70:01:02:03:42     |
| ...   |        | ...                                                    |
|       |        |                                                        |

Fig. 16

Name of Storage(8001): Storage1
Storage IP Address(8002): 192.168.1.254

| Port# (1903) | Name (1904) | Host group (1905) | WWNs (1906) | Volume # (1907) |
|---|---|---|---|---|
| 0 | CL1-A | 1 | 50:00:08:70:00:57:34:00, …. | 1 |
|   |   | 2 | … | … |
|   |   | … | … | … |
| … | … | … | … | … |
| 1 | CL3-A | 1 | … | … |
|   |   | … | …. | … |

Fig. 19

| Name (30001) | UUID (30002) | MGMT IP Address (30003) | Virtual Switch (30004) | NIC # (30005) | MAC (30006) | VLANs (30007) |
|---|---|---|---|---|---|---|
| server1 | 150e8400-e29b-41d4-a716-446655440000 | 192.168.1.100 .... | VSwitch 1 | 1 | B8:AC:6F:8E:8E:4A | 10, 20 |
| | | | | 2 | B8:AC:6F:8E:8E:4B | 10, 20 |
| server2 | 150e8400-e29b-41d4-a716-446655440001 | 192.168.1.101 .... | VSwitch 2 | 1 | B8:AC:6F:8E:8E:4C | 10, 20 |
| | | | | 2 | B8:AC:6F:8E:8E:4D | 10, 20 |
| server3 | 150e8400-e29b-41d4-a716-446655440003 | 192.168.1.102 .... | VSwitch 3 | 1 | B8:AC:6F:8E:8E:4E | 10, 20 |
| | | | | 2 | B8:AC:6F:8E:8E:4F | 10, 20 |
| .... | ... | .... | | ... | .... | |
| .... | ... | .... | | ... | .... | |

Fig. 21

| Name (31001) | IP Address (31002) | Attribute (31003) |
|---|---|---|
| AccessSW1 | 192.167.1.1 | Access |
| AccessSW2 | 192.167.1.2 | Access |
| AccessSW3 | 192.167.1.3 | Access |
| AccessSW4 | 192.167.1.4 | Access |
| AggregationSW1 | 192.167.2.1 | Aggregation |
| AggregationSW2 | 192.167.2.2 | Aggregation |
| | | |

Fig. 22

Name(31001) : AccessSW1
IP Address(31002):192.167.1.1

| Port # (32001) | Discovered Device IP (32003) | Discovered Port ID (32004) |
|---|---|---|
| 1 | 192.168.1.100 (Server1) | B8:AC:6F:8E:8E:4A |
| 2 | 192.167.1.101 (Server2) | B8:AC:6F:8E:8E:4C |
| ... | ... | ... |
| 6 | 192.167.2.1 (AggregationSwitch1) | 1 |
| 7 | 192.167.2.2 (AggregationSwitch2) | 1 |
| ... | ... | ... |

Fig. 23

Name(31001) : AggregationSW1
IP Address(31002):192.167.2.1

| Port # (33001) | Discovered Device IP (33003) | Discovered Port ID (33004) |
|---|---|---|
| 1 | 192.167.1.1(AccessSW1) | 6 |
| 2 | 192.167.1.2(AccessSW2) | 6 |
| 3 | 192.167.1.3(AccessSW3) | 6 |
| 4 | 192.167.1.4(AccessSW4) | 6 |
| 5 | 192.167.2.2 (AggregationSwitch2) | 5 |
| ... | ... | ... |

Fig. 24

| Source Device ID (34001) | Source Device Port (34002) | Connected Device ID (34003) | Connected Device Port (34004) |
|---|---|---|---|
| 192.168.1.100 (Server1) | B8:AC:6F:8E:8E:4A | 192.167.1.1 (AccessSW1) | 1 |
| 192.168.1.100 (Server1) | B8:AC:6F:8E:8E:4B | 192.167.1.2 (AccessSW2) | 1 |
| ... | ... | ... | ... |
| 192.167.1.1 (AccessSW1) | 6 | 192.167.2.1 (AggregationSW1) | 1 |
| 192.167.1.1 (AccessSW1) | 7 | 192.167.2.2 (AggregationSW1) | 1 |
| ... | ... | ... | ... |

Fig. 25

| Path
(37001) |
|---|
| NIC 1 of 192.168.1.100(Server1)
->192.167.1.1(AccessSW1)
->192.167.2.1(AggregationSW1)
->192.167.1.3(AccessSW3)
->NIC1 if 192.168.1.102(Server3) |
| NIC 2 of 192.168.1.100(Server1)
->192.167.1.2(AccessSW1)
->192.167.2.1(AggregationSW1)
->192.167.1.3(AccessSW3)
->NIC1 if 192.168.1.102(Server3) |
| ... |

Fig. 28

| Path (38001) |
|---|
| NIC 1 of 192.168.1.100(Server1)<br>->192.167.1.1(AccessSW1)<br>->192.167.2.1(AggregationSW1)<br>->192.167.1.3(AccessSW3)<br>->NIC1 if 192.168.1.102(Server3) |
| ... |

Fig. 29

| Device ID (40001) | Device Port (40002) |
|---|---|
| 192.168.1.100 (Server1) | B8:AC:6F:8E:8E:4A |
| 192.168.1.100 (Server1) | B8:AC:6F:8E:8E:4B |
| ... | ... |
| 192.167.1.1 (AccessSW1) | 6 |
| 192.167.1.1 (AccessSW1) | 7 |
| ... | ... |

Fig. 31

METHOD AND APPARATUS OF REDUNDANT PATH VALIDATION BEFORE PROVISIONING

BACKGROUND OF THE INVENTION

The present invention relates generally to storage systems and, more particularly, to method and apparatus of redundant path validation before provisioning volume.

In a datacenter, there are a lot of cables which connect among servers and storages by Ethernet Switch and Fibre Channel Switch. To connect among such equipment with redundancy, the difficulties to configure the system increase and human errors can occur. It is hard for server or virtual machine administrator to set up such a system. For example, an administrator, especially a hypervisor administrator, is required to provision volume. This involves taking time (e.g., several minutes) to find the storage's locked resources (i.e., storage reservation). It can be hard to discover the provisioned volume and it can take a lot of time in a system having Fibre Channel (FC) Switch (FC-SW) for the administrator and storage administrator to figure out the configuration.

U.S. Pat. No. 7,617,320 discloses a validation method of HA logical connection after LUN provisioning. This method focuses on HA logical paths for a LUN after creation of LUN. It does not consider physical cablings and storage ports' redundancy.

BRIEF SUMMARY OF THE INVENTION

Exemplary embodiments of the invention provide a technique to validate physical cabling and logical path before provisioning volume. This has the benefits of providing ensured redundant physical cables and logical paths, eliminating FC-SW and Storage Administrator's involvement in volume provisioning, and avoiding the use of storage's locked resources on volume.

In one example, the system includes at least a storage, FC-SWs (Core and Edge switches), management server, and Virtual Machine Servers (also applicable for normal server). In this configuration, a management software running on the management server validates the physical cabling and logical path which is Fibre Channel zoning. The management software performs the following process. First, the software specifies the server's and storage's target ports. Second, the software validates the physical cable using Server HBA ports' WWNs (World Wide Names) and storage's port WWNs on Switch discovered WWN's information and redundancy using Domain ID. It repairs the cable using reserved cabling if the validation fails. Third, the software validates the logical path (zone) using HBA ports' WWNs and storage's port WWNs on FC-SW. This may involve adding Server HBA port's WWN on storage's WWN having zone if Server port's WWN is missing the zone, adding Storage port's WWN on server's WWN having zone if Storage's port's WWN is missing the zone, add new zone with storage port's WWN and server's WWN, or adding server's WWNs for host group in Storage's port and, if there is no Host group in Storage's target port, then adding the host group. Fourth, the software provisions volume to server and discover the volume if the physical path and logical path are configured correctly. In another embodiment, the software also considers Node Port Interface Virtualization (NPIV) to validate logical path and repair the logical path for NPIV's WWN.

In another example, the system validates and configures redundant Ethernet networks among servers where virtual machines (VMs) run. Access switches are connected via aggregation switches to storage system. VMs are connected to virtual switches which are connected to NICs (Network Interface Cards). The NICs are connected to the access switches. This example involves validating redundancy between the servers and access switches. This can be accomplished by finding at least two shortest paths between the servers without aggregation switches in those paths.

In accordance with an aspect of the present invention, a computer comprises a memory storing software and a processor executing the software. The software is operable to: identify first server port and second server port forming redundant ports of a server and first storage port and second storage port forming redundant ports of a storage system; and check whether a redundant relationship is formed by at least one of (i) a physical connection between the first server port and the first storage port and a physical connection between the second server port and the second storage port, or (ii) a logical connection between the first server port and the first storage port and a logical connection between the second server port and the second storage port.

In some embodiments, the software is operable to provide the first storage port and the second storage port to be used to access a same logical volume of the storage system. The software is operable to check whether a redundant relationship is formed by both of (i) a physical connection between the first server port and the first storage port and a physical connection between the second server port and the second storage port, and (ii) a logical connection between the first server port and the first storage port and a logical connection between the second server port and the second storage port.

In specific embodiments, the software is operable to provision volume from the storage system after validating the redundant relationship. The software is operable to validate physical connection between the first server port and the first storage port and to validate physical connection between the second server port and the second storage port in order to establish a redundant relationship of physical connection. If the software does not validate one or both of the physical connection between the first server port and the first storage port and the physical connection between the second server port and the second storage port in order to establish a redundant relationship of physical connection, the software is operable to repair the one or both of the physical connections using reserved ports provided in reserved information stored in the memory so as to establish the redundant relationship of physical connection.

In specific embodiments, the software is operable to validate logical connection between the first server port and the first storage port and to validate logical connection between the second server port and the second storage port in order to establish a redundant relationship of logical connection. If the software does not validate one or both of the logical connection between the first server port and the first storage port and the logical connection between the second server port and the second storage port in order to establish a redundant relationship of logical connection, the software is operable to create a new zone with server port WWN (World Wide Name) and storage port WWN to repair each of the one or both of the logical connections, so as to establish the redundant relationship of logical connection.

In some embodiments, the first server port and the second server port are used by a same virtual machine of the server. The software is operable to validate logical connection between the first server port and the first storage port and to validate logical connection between the second server port and the second storage port in order to establish a redundant relationship of logical connection for the virtual machine. If the software does not validate one or both of the logical connection between the first server port and the first storage port and the logical connection between the second server port and the second storage port in order to establish a redundant relationship of logical connection for the virtual machine, the software is operable to create a new zone for NPIV (Node Port Interface Virtualization) with virtual machine port WWN (World Wide Name) and storage port WWN to repair each of the one or both of the logical connections, so as to establish the redundant relationship of logical connection for the virtual machine.

In accordance with another aspect of the invention, a system comprises a storage system, and a computer including a memory storing software and a processor executing the software. The software is operable to: identify first server port and second server port forming redundant ports of a server and first storage port and second storage port forming redundant ports of a storage system; and check whether a redundant relationship is formed by at least one of (i) a physical connection between the first server port and the first storage port and a physical connection between the second server port and the second storage port, or (ii) a logical connection between the first server port and the first storage port and a logical connection between the second server port and the second storage port.

In some embodiments, the system further comprises the server having the first server port and the second server port. The server having the first server port and the second server port is a first server having a first NIC (Network Interface Card) and a second NIC. The system further comprises a second server having a third NIC and a fourth NIC. Each server of the first and second servers includes virtual machines connected to virtual switches which are connected to NICs. The system further comprises access switches which are coupled between the first and second servers and aggregation switches, the aggregation switches being coupled with the storage system. Checking whether a redundant relationship of physical connection is formed by a physical connection between the first server port and the first storage port and a physical connection between the second server port and the second storage port comprises validating connectivity between the virtual switches and the NICs for each of the first and second servers. Checking whether a redundant relationship of logical connection is formed by a logical connection between the first server port and the first storage port and a logical connection between the second server port and the second storage port comprises validating redundancy between the first and second servers and the access switches, which includes: enumerating all paths between the first and second NICs of the first server and the third and fourth NICs of the second server and storing the enumerated paths in a path table; choosing a shortest path from the enumerated paths in the path table, storing the chosen shortest path in a shortest path table, and removing the chosen shortest path from the path table; removing all paths from the shortest path table which contain one or more aggregation switches; if there are one or more paths remaining in the path table, then repeating the choosing and the removing until there are no more paths remaining in the path table; and validating that a redundant relationship of logical connection is formed if there are at least two chosen shortest paths remaining after the removing.

In specific embodiments, the software is operable, after validating the redundant relationship of physical connection and the redundant relationship of logical connection, to set VLAN (Virtual Local Area Network) IDs to the first and second switch ports.

Another aspect of this invention is directed to a computer-readable storage medium storing a plurality of instructions for controlling a data processor to validate redundant paths. The plurality of instructions comprise: instructions that cause the data processor to identify first server port and second server port forming redundant ports of a server and first storage port and second storage port forming redundant ports of a storage system; and instructions that cause the data processor to check whether a redundant relationship is formed by at least one of (i) a physical connection between the first server port and the first storage port and a physical connection between the second server port and the second storage port, or (ii) a logical connection between the first server port and the first storage port and a logical connection between the second server port and the second storage port.

In some embodiments, the plurality of instructions include instructions that cause the data processor to provide the first storage port and the second storage port to be used to access a same logical volume of the storage system. The plurality of instructions comprise instructions that cause the data processor to check whether a redundant relationship is formed by both of (i) a physical connection between the first server port and the first storage port and a physical connection between the second server port and the second storage port, and (ii) a logical connection between the first server port and the first storage port and a logical connection between the second server port and the second storage port. The plurality of instructions comprise instructions that cause the data processor to provision volume from the storage system after validating the redundant relationship.

In specific embodiments, the first server port and the second server port are used by a same virtual machine of the server. The plurality of instructions comprise: instructions that cause the data processor to validate logical connection between the first server port and the first storage port and to validate logical connection between the second server port and the second storage port in order to establish a redundant relationship of logical connection for the virtual machine; and instructions that cause the data processor, if the software does not validate one or both of the logical connection between the first server port and the first storage port and the logical connection between the second server port and the second storage port in order to establish a redundant relationship of logical connection for the virtual machine, to create a new zone for NPIV (Node Port Interface Virtualization) with virtual machine port WWN (World Wide Name) and storage port WWN to repair each of the one or both of the logical connections, so as to establish the redundant relationship of logical connection for the virtual machine.

These and other features and advantages of the present invention will become apparent to those of ordinary skill in the art in view of the following detailed description of the specific embodiments.

BRIEF DESCRIPTION OF THE DRAWINGS

FIG. 3 shows an example of a table of server configuration.

FIG. 4 shows an example of a table of FC-SWs.

FIG. 5 shows an example of a table of port configuration on Core FC-SW.

FIG. 6 shows an example of a table of port configuration on Edge FC-SW.

FIG. 7 shows an example of a table of zones.

FIG. 8 shows an example of a table of storage configuration.

FIG. 14 shows an example of a table of collected VM configuration.

FIG. 15 shows an example of a table of port configuration for Edge FC-SW according to the second embodiment.

FIG. 16 shows an example of a table of zone list according to the second embodiment.

FIG. 19 shows an example of a table of host group in storage configuration.

FIG. 21 shows an example of a Server Table for Ethernet.

FIG. 22 shows an example of an Ethernet Switch Table.

FIG. 23 shows an example of a Ports on Access Switch Table.

FIG. 24 shows an example of a Ports on Aggregation Switch Table.

FIG. 25 shows an example of a Topology Summary Table.

FIG. 28 shows an example of a Path Table.

FIG. 29 shows an example of a Shortest Path Table.

FIG. 31 shows an example of a Set Port Table.

DETAILED DESCRIPTION OF THE INVENTION

Figure 1:
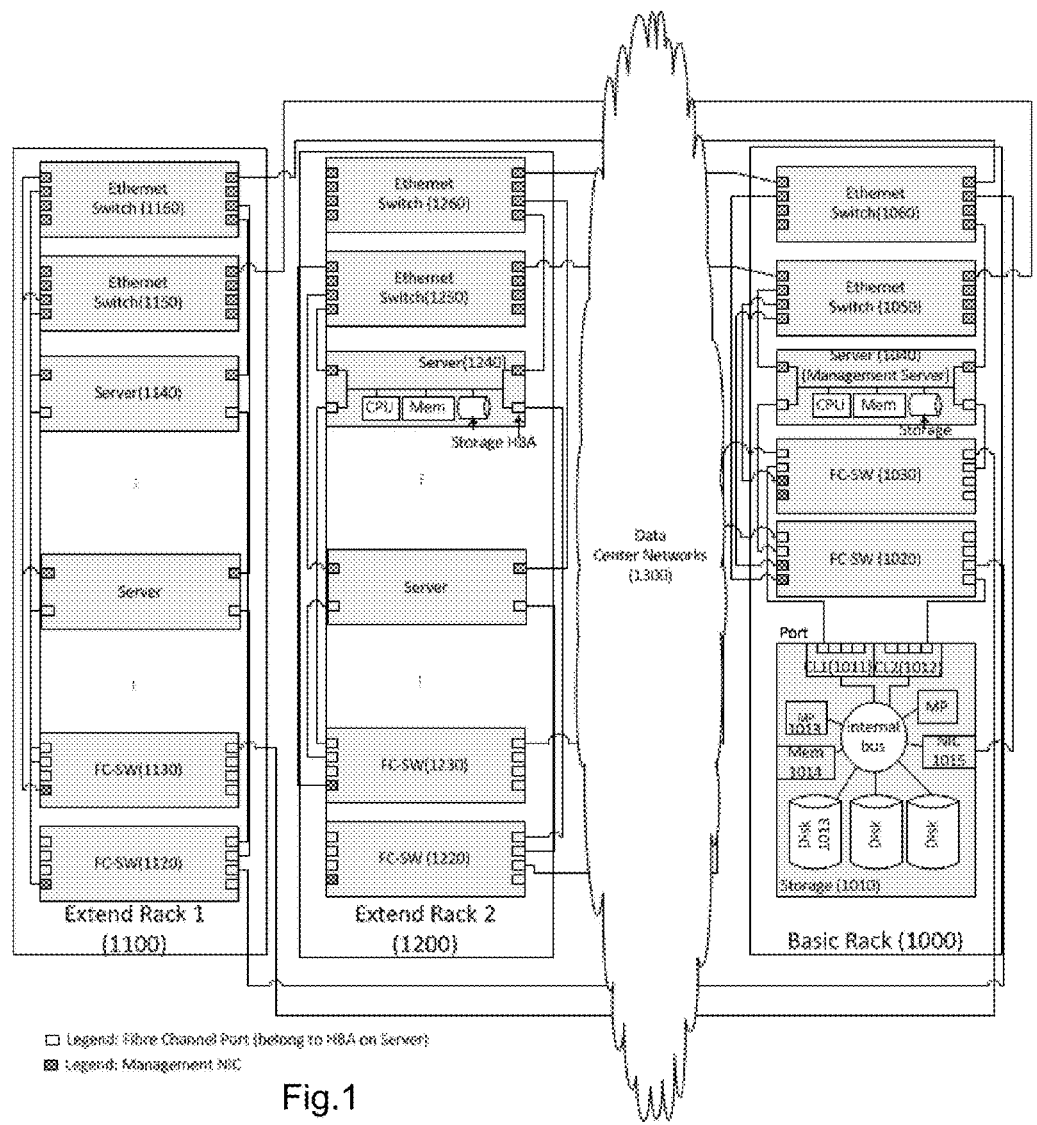
FIG. 1 illustrates an example of a physical configuration of a system in which the method and apparatus of the invention may be applied.

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment," "this embodiment," or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium including non-transient medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus. Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments of the invention, as will be described in greater detail below, provide apparatuses, methods and computer programs for redundant path validation before provisioning volume.

1. First Embodiment

The first embodiment is directed to a validation method of redundant physical cable and logical paths before volume provisioning. It has the benefits of providing ensured redundant physical cables and logical paths, eliminating FC-SW and Storage Administrator's involvement in volume provisioning, and avoiding the use of storage's locked resources on volume.

FIG. 1 illustrates an example of a physical configuration of a system in which the method and apparatus of the invention may be applied. The system includes Basic Rack 1000 and Extend Racks 1100, 1200. The basic rack has at least a Storage Subsystem 1010 (i.e., Storage), two core FC-SWs 1020, 1030 in Basic Rack, a Server for management 1040, and two core Ethernet Switches 1050, 1060. Core FC-SWs' ports are connected to the storage's ports and other Edge FC-SWs (1120, 1130, 1220, 1230) on the Extend Racks by Fibre Channel protocol applicable cables. Ethernet switches' ports connect to Storage's NIC, FC's management NIC, and other Edge Ethernet Switches. The Extend Racks 1100, 1200 each have servers, Edge FC-SWs (1120, 1130, 1220, 1230), and Edge's Ethernet switches (1150, 1160, 1250, 1260). Edge's FC-SWs' ports connect to servers (1140 or 1140) and Core switches' ports using interconnections between Edge's FC-SWs and Core FC-SWs.

The storage 1010 includes several ports having independent clusters (1011, 1012), Micro Processor (MP, 1013), Memory (MEM, 1014), Disks 1013 including Solid State Disk (SSD), NIC I/F 1015, and internal buses among parts. The storage's MP runs microcode to protect user data by RAID technology and provision a volume which is comprised of a set of disks protected by RAID via port on controllers. The storage has been designed as redundant parts protecting memory data protected by battery backup.

The server is a general server, which includes processor, memory, Network Interface Card (NIC), and Host Bus Adapter (HBA) (not shown).

The server runs hypervisor such as Hyper-V®, VMware® or KVM (Kernel-based Virtual Machine), or some other kind of generic hypervisor. The Ethernet Switches 1050, 1060 each include ports to connect among Server, Storage, and FC-SW NIC. The ports can process frames such as IEEE 802.3 and related frames and are connectable to the IEEE 802.3 frame applicable cable. The FC-SWs 1020, 1030 each include ports and management NIC. The ports can process frames such as Fibre Channel Protocol and are connectable to the Fibre Channel Protocol applicable cable. Connection of FC-SWs and Ethernet switches should consider redundant topology. FC-SWs are designed to have two independent networks. Ethernet switches are also designed to have two independent networks. Regarding redundancy of array's ports, storage subsystem had independent cluster.

Between the basic and extend racks, there may be a datacenter network 1300. The network may use patch panels which aggregate cables on a place and exchange cables from one equipment to another equipment. This panel is managed by mostly network administrators or cable administrators. As such, there would be error in configuration.

Figure 2:
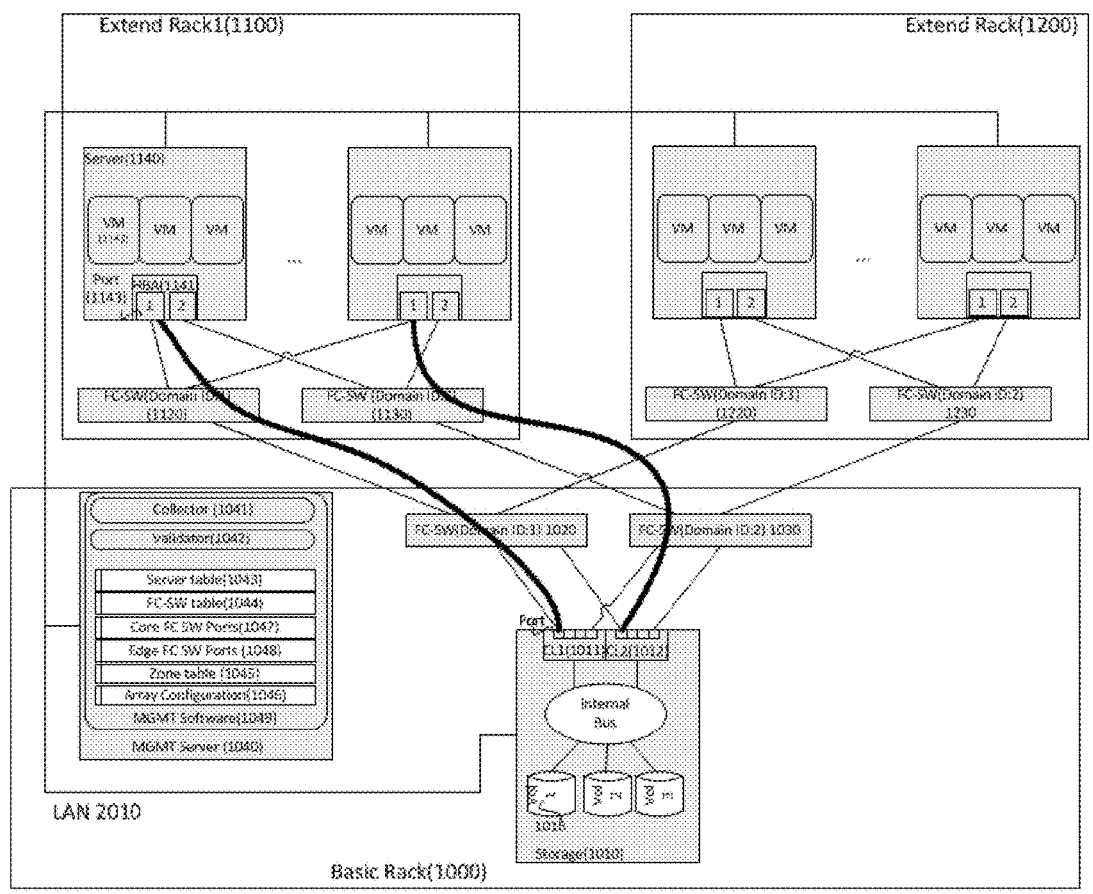
FIG. 2 shows an example of a logical configuration of the system of FIG. 1 from the storage's point of view according to the first embodiment.

FIG. 2 shows an example of a logical configuration of the system of FIG. 1 from the storage's point of view according to the first embodiment. The system includes the Basic Rack 1000 and Extend Racks 1100, 1200.

The Basic Rack 1000 includes at least one storage 1010, two FC-SWs 1020 and 1030, and a Management Server 1040. The storage provides a volume from the storage's ports on independent hardware clusters 1011, 1012, which provide redundancy of ports, based on storage administrator operations or management software on the management server's instructions. The management server 1040 has management software (MGMT software, 1049) to validate physical cables and logical paths before volume provisioning. The software includes configuration info collector 1041 for servers, the FC-SWs, and the storage, validator 1042 for the physical cables and logical path, a table of server configuration 1043, a table of FC-SWs port configuration 1044, tables of FC-SW Port for Core 1047 and Edge's FC-SW 1048, a table of Zone 1045, and a table of Storage Configuration 1046 (shown in FIG. 2 on 1040). The management software has a capability to provision volume for the user's specified storage's ports (not depicted). The FC-SWs (1020, 1030, 1120, 1130, 1220, 1230) each have been configured as an independent multiple redundant network such as a group of 1020, 1120, 1220 and another group of 1030, 1130, 1230. To keep the FC-SWs' network's (Fabrics' network) redundancy, the FC-SW industry uses domain concept. A domain has an identifier as a unique domain ID in a Fabric which consists of several connected FC-SWs. In this example, we use 1 as first group and 2 as second group. If there are redundant fabric networks, there are two domain IDs as shown in this figure. The domain ID does not overlap if the fabric networks are independent.

The Extend Rack has at least a server 1140 and two FC-SWs 1120 and 1130. The Servers each include at least a two-port HBA 1143, a hypervisor (not shown in the figure) to run Virtual Machine (VM), and VMs 1142. The VMs may run operating system such as Windows or Linux. The FC-SW hardware capability is the same as that in the Basic Rack. The FC-SW connects between the Basic Rack and Extend Rack using FC-SW's interconnect paths between Edge's FC-SW and Core FC-SW. For example, Edge's FC-SW 1120 connects to Core FC-SW 1020 and Edge's FC-SW 1130 connects to Core FC-SW 1030. The connection from a server to storage is as follows. A server has a HBA 1141. The HBA's ports connect to Edge FC-SW 1120 and 1130. An Edge FC-SW connects to a core FC-SW as mentioned earlier. The FC-SW connects to two different redundant cluster's (1011 and 1012) storage ports so as to keep redundancy of ports. Using Ethernet Switches (1050, 1060, 1150, 1160, 1250, 1260), the LAN connects among servers, FC-SW, and storages for the management software 1049. In this embodiment, we do not show details of LAN configuration using the Ethernet Switches. Regarding the connection from a server to a storage, the bold line shows it as an example of path.

FIG. 3 shows an example of a table of server configuration 1043. The table includes columns of Name of server 3001, UUID 3002, management NIC's IP address 3003 for the server, HBA's port numbers 3004, WWN on the port 3005, and whether the port is reserved or not 3006. UUID is universally unique identifier for a server in order to prohibit duplication of a server under distributed environment. WWN (World Wide Name) is hardware 8 byte identifier defined by IEEE and is assigned for each port on HBA.

FIG. 4 shows an example of a table of FC-SWs (1044). The table includes columns of name of switch 4001, IP address 4002 for the switch, and domain ID 4003 to display relation of fabric network.

FIG. 5 shows an example of a table of port configuration 1047 on Core FC-SW (1020, 1030). On the top of the table, Name 5001, IP address 5002, and Domain ID 5003 are stored. The table includes columns of actual FC-SW's Port #5011, Link up/down 5012 for the ports, Discovered WWNs 5013 on the port, and Reserved information 5014 for the port in this system. The discovered WWNs on a port are shown storage's port's WWN because FC-SW is login on initial connection such as link up/down or power up/down using fabric login from server HBA or storage's port with each WWN. Regarding a connection between FC-SWs, we show a list of server HBA port's WWN. The information except column of reserved information is gathered from the core FC's Switches via the LAN. The reserved information is defined by the management software.

FIG. 6 shows an example of a table of port configuration 1048 on Edge FC-SW. The format is the same as that for core FC-SW. The difference compared with core FC-SW's table (FIG. 5) is that the discovered WWNs are different because Edge connects to server directly and most of ports show a server HBA port's WWN. Regarding a connection between FC-SWs, we show a list of storage's port WWN.

FIG. 7 shows an example of a table of zones 1045. The table includes Domain ID 7001, and columns of Zone #7002, name for the zone 7003, and WWNs 7004 under the zone. The zone on Fibre Channel provides a capability to make a logical path within defined WWNs under the domain ID. The information except Reserved information is gathered from core FC's Switches.

FIG. 8 shows an example of a table of storage configuration 1046. The table includes Name of Storage 8001, Storage NIC's IP address 8002, and columns of Storage's Port #8003, name of port 8004, WWN for the port 8005, cluster 8006 belonging to the port, and reserved information 8008. Regarding reserved information 8008, a port is a reserved port that can be used to repair physical cable if necessary.

FIG. 19 shows an example of a table of host group in storage configuration. The host group manages to access Fibre Channel packet from host based on server port's WWN to a volume. The table includes Name of Storage 8001, Storage NIC's IP address 8002, and columns of array's port #1903, Name of port 1904, Host Group 1905, WWNs 1906, and volume number 1907. When storage creates a host group with server port WWNs and volume, the host can see the volume. On access volume from the host, the storage assigns a Logical Unit Number as an address of volumes in array port. The method and behavior of volume provision are described below.

Figure 9:
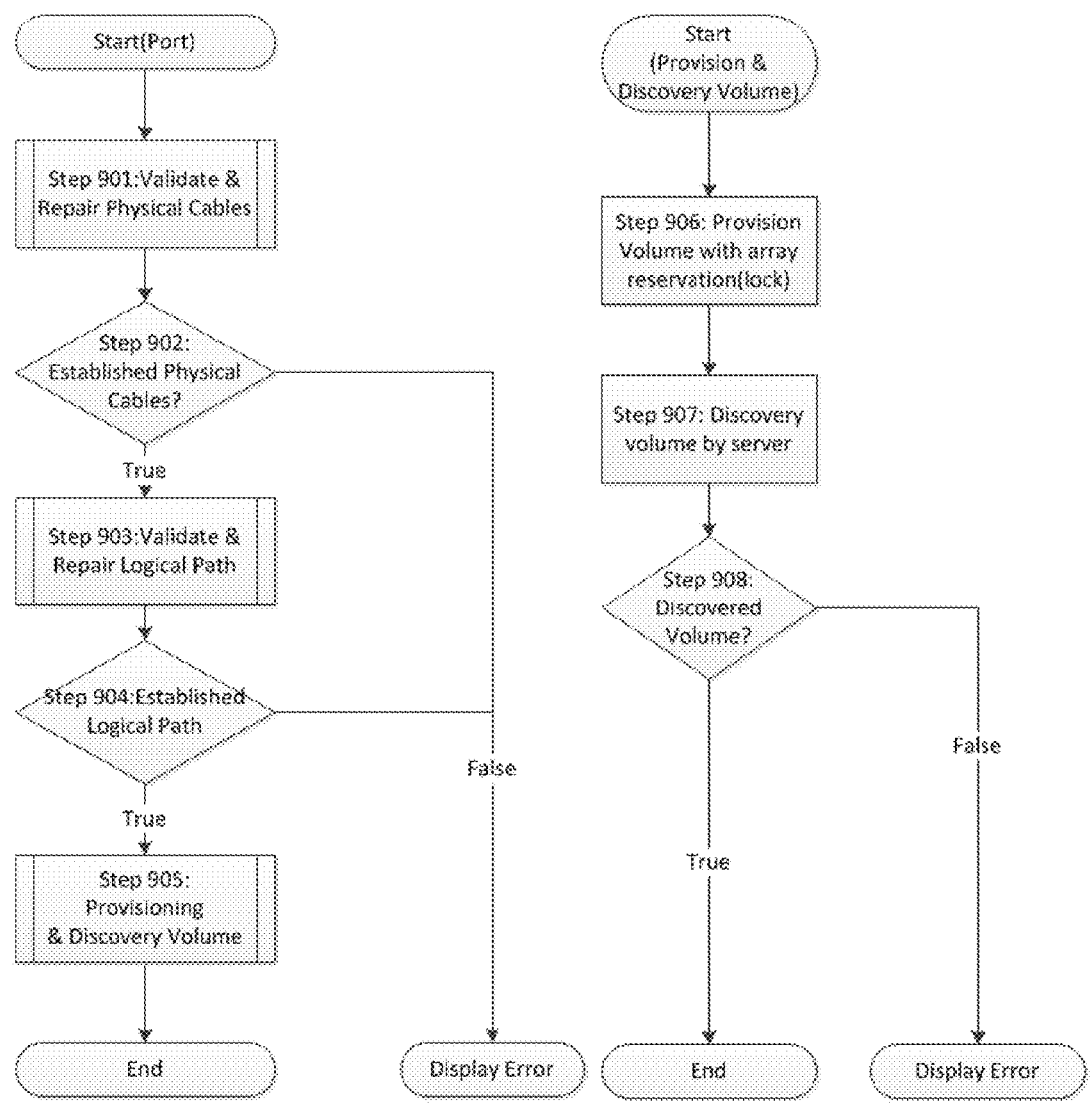
FIG. 9 shows an example of a flow diagram illustrating the volume provisioning approach on the management software according to the first embodiment.

FIG. 9 shows an example of a flow diagram illustrating the volume provisioning approach on the management software 1049 according to the first embodiment. As an input, a management software administrator such as a hypervisor administrator selects the storage's ports which is connected from servers and is provisioned a volume. In step 901, the management software validates and repairs the physical cables based on the administrator specified storage ports. Details of this step will be described in connection with FIG. 10. In step 902, the management software checks whether there are established physical cables between servers and storage's port considering redundancy based on the result of step 901. If true, the process goes to step 903; if false, the software displays an error. In step 903, the management software validates and repairs the logical paths. Details of this step will be described in connection with FIG. 12. In step 904, the management software checks whether there are established logical paths, which means zone, between servers and storage's port considering redundancy based on the result of step 903. If true, the process goes to step 905; if false, the software displays an error. In step 905, the software provisions volume on storage and discovery volume on server (see steps 906-908). Using these steps 901-904, the administrator can validate the physical cables and logical paths before provisioning volume.

The method to provision and discover volume is illustrated in steps 906-908. The management software provisions volumes for a host group, which has the target server's WWN, on target ports using host group with server WWNs (step 906). During the provisioning, the storage uses the storage's locked resources to prevent from other user's interventions (step 907). After the provision of volume, the management software indicates discovery of volume on the server (step 908). If discovery has succeeded, the process ends; otherwise, the management software displays an error for the administrator.

Figure 10:
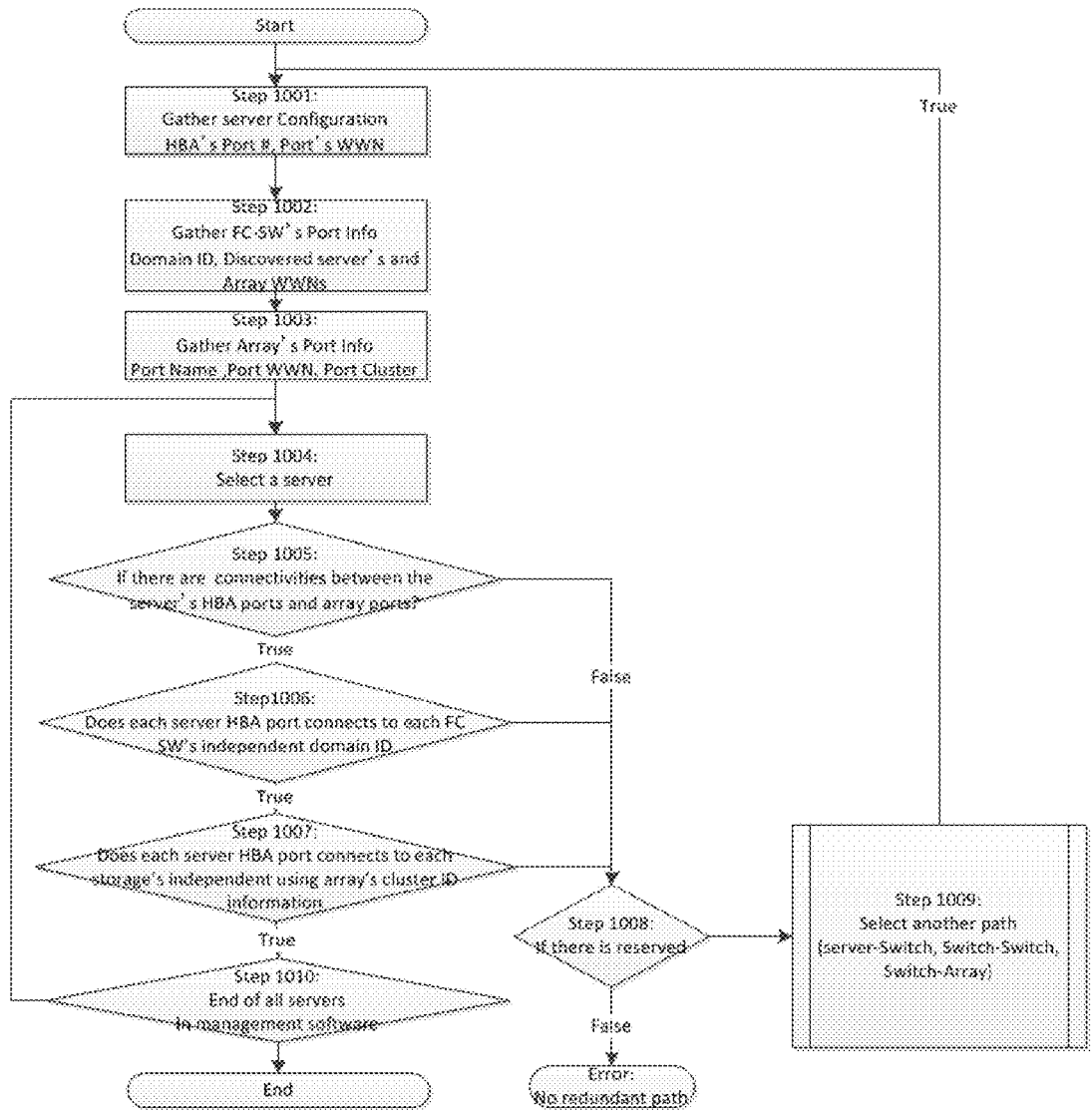
FIG. 10 shows an example of a flow diagram illustrating the details of validation and repairing the physical cables on the management software.

FIG. 10 shows an example of a flow diagram illustrating the details of validation and repairing the physical cables on the management software 1049. As a series of input from step 9001, it uses the administrator specified storage's ports.

In step 1001, the management software gathers server configuration from servers and stores the server configuration shown in FIG. 3. To gather the data, it uses CIM, SSH, XML, WEBM, or some other kind of I/F. In step 1002, the management software gathers FC-SWs' configuration and stores it as shown in FIGS. 5 and 6 based on FC-SW's list in FIG. 4. To gather FC-SW configuration, it uses SMIS, SSH, XML, WEBM, or some other kind of I/F. In step 1003, the management software gathers storage's port configuration and stores it as shown in FIG. 6. To gather the storage configuration, it uses SMI-S, RMI, XML API, or some other kind of I/F. In step 1004, the management software selects a server from the servers listed in FIG. 3. In step 1005, the management software validates connectivity from a Server HBA's port to selected storage's ports tracing from Edge's FC-Switch discovered Server HBA port's WWNs and storage's port WWN. For example, if the administrator selects four storage's ports, the management server gets a Server HBA port's WWN from the table of server configuration of FIG. 3 and gets selected four storage port WWNs from the table of storage port configuration of FIG. 6, and then it matches the Server HBA's WWN and the storage's port WWNs using all column of un-reserved discovered WWNs (which is un-shown as "reserved" flag on 3006) on the Edge Switch. If there is a match, the process goes to step 1006. If there is no match, the process goes to step 1008.

In step 1006 (after the management software found a connection between server port's WWN and storage port's WWN in step 1005), the management software validates if each server HBA port connects to a FC-SW's independent domain ID using column of discovered WWNs on active ports in table of Ports on Edge FC-SW (FIG. 6). If there is independent domain ID based on HBA's ports, the process goes to step 1007. If not, the process goes to step 1008.

In step 1007 (after the management software found a connection between server port's WWN and storage port's WWN in step 1005 and validates that each server HBA port connects to a FC-SW's independent domain ID), the management software validates if each server HBA port connects to each storage's independent storage's cluster using the storage's cluster information. Under a domain, if one server HBA port's WWN has at least two target storage array ports based on domain cache information which is comprised of discovered all WWN on a domain and under another domain and another HBA port's WWN has at least two target storage array port, the validation process is a success. If not, the process is a failure. If the validation is successful, the process goes to step 1010. If the validation is failure, the process goes to step 1008.

Figure 11:
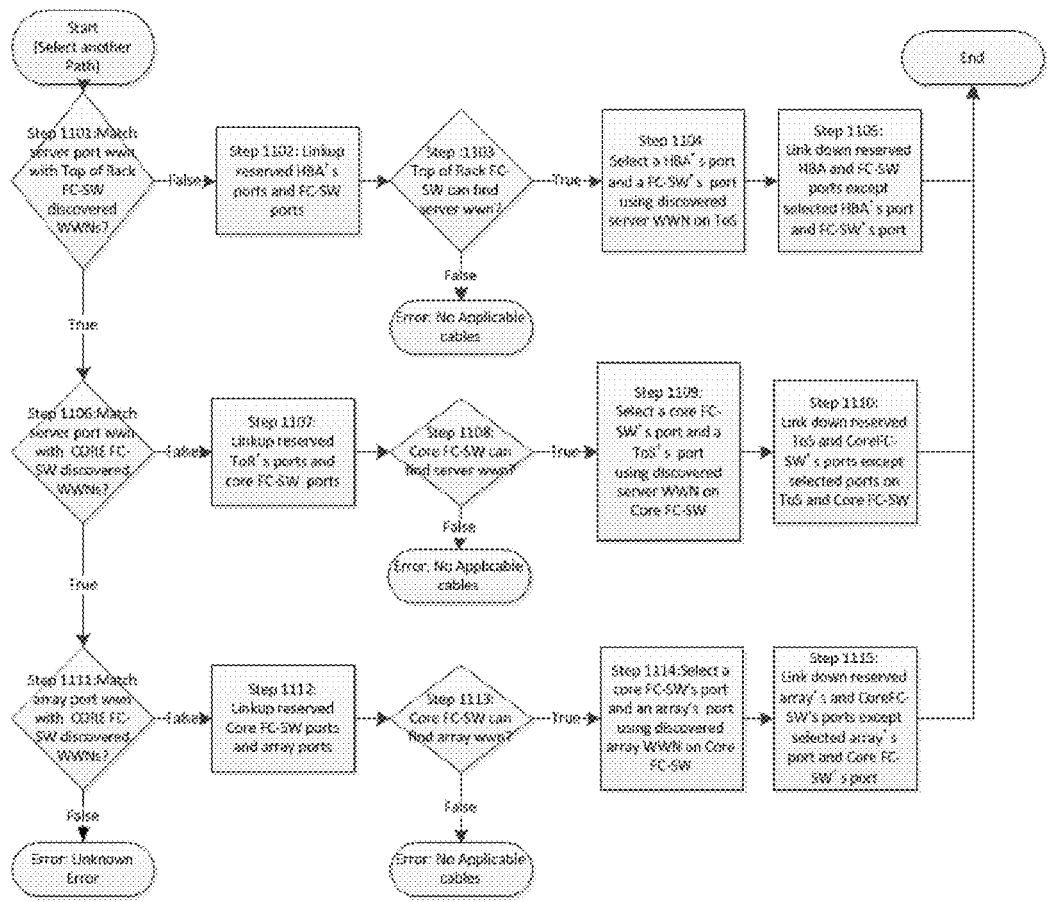
FIG. 11 shows an example of a flow diagram illustrating a process to select a reserved cable to fix a physical cable issue.

In step 1008, the management software checks for all reserved ports on Core or Edge FC-SW's ports using FIGS. 5 and 6. If there are any reserved ports, the process goes to step 1009. If there is no reserved port, the management software reports an error as failure of validation. In step 1009, the management software selects another path. Details of this step are shown in FIG. 11. In step 1010, the management software checks if this process is executed for all servers or not. If the process has been executed for all servers, the process ends. If not, the process goes to step 1004.

FIG. 11 shows an example of a flow diagram illustrating a process to select a reserved cable to fix a physical cable issue. The inputs are a server and target storage's ports from step 1009.

In step 1101, the management software matches the server HBA port's WWN and discovered WWN in FIG. 6 (Edge FC-SW). If the match fails, the process goes to step 1102. If there is a match, the process goes to step 1106. In step 1102, the management software links up reserved HBA's port and reserved Edge FC-SW ports using SMI-S CIM (Common Information Model), SSH (secure socket shell), or some other I/F for server and Edge FC-SW. In step 1103, the management software matches the server HBA port's WWN and discovered WWN in FIG. 6. If the match fails, the management software links down reserved ports the same as using link up's I/F and returns error as no applicable cables. If there is a match, the process goes to step 1104. In step 1104, the management software selects a HBA's port and an Edge FC-SW's port removing the state of reserved from server configuration and Edge FC-SW's port configuration. In step 1105, the management software links down reserved HBA's ports and an Edge FC-SW's ports except the selected HBA's port and FC-SW's port. The process ends.

In step 1106, the management software matches the server HBA port's WWN and discovered WWN in FIG. 5 (core FC-SW). If the match fails, the process goes to step 1107. If there is a match, the process goes to step 1111. In step 1107, the management software links up reserved HBA's port and reserved core FC-SW ports using SMI-S, CIM, SSH, or some other I/F for server and core FC-SW. In step 1108, the management software matches the server HBA port's WWN and discovered WWN in FIG. 5. If the match fails, the management software links down the same as using link up's I/F for reserved ports and returns error as no applicable cables. If there is a match, the process goes to step 1109. In step 1109, the management software selects a HBA's port and a core FC-SW's port removing the state of reserved from server configuration and core FC-SW's port configuration. In step 1110, the management software links down reserved HBA's ports and a core FC-SW's ports. The process ends.

In step 1111: Management software matches the storage port's WWN and discovered WWN in FIG. 5. If the match fails, the process goes to step 1112. If there is a match, the software issues an unknown error message. In step 1112, the management software links up reserved storage's port and core FC-SW ports using XML API, RMI, CIM, SSH, or some other I/F for storage and core FC-SW. In step 1113, the management software matches the storage port's WWN and discovered WWN in FIG. 5. If the match fails, the management software executes link down for reserved ports and returns error as no applicable cables. If there is a match, the process goes to step 1114. In step 1114, the management software selects a HBA's port and a core FC-SW's port removing the state of reserved from the storage port configuration and core FC-SW's port configuration. In step 1115, the management software links down reserved storage's ports and a core FC-SW's ports. The process ends. Using this process, the cables can be established using reserved ports and reserved cables.

Figure 12:
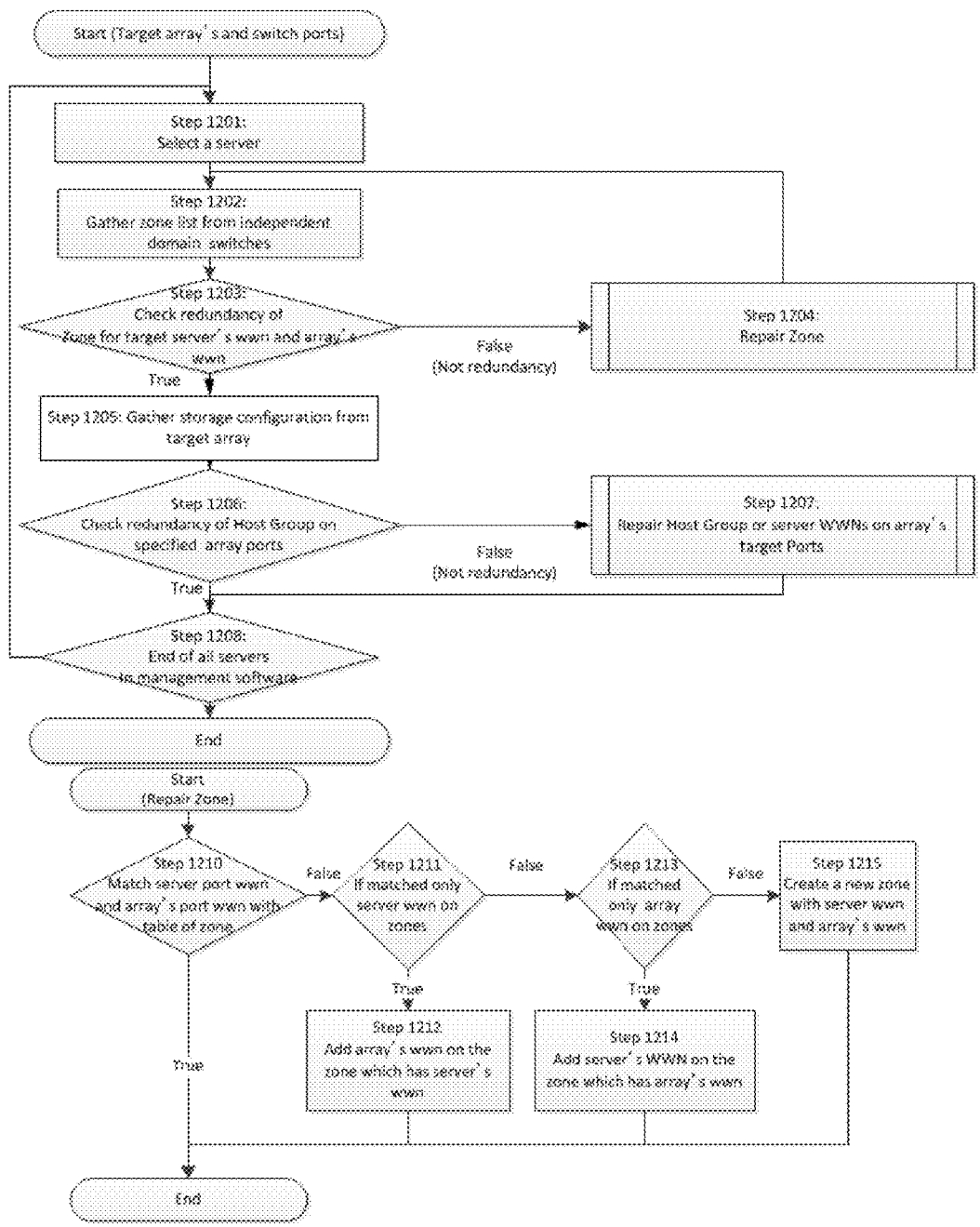
FIG. 12 shows an example of a flow diagram illustrating a process to validate logical path (zone in this invention) and fix it when necessary.

FIG. 12 shows an example of a flow diagram illustrating a process to validate logical path (zone in this invention) and fix it when necessary. This process is executed to each "domain ID"-ed Edge FC switches. In this configuration, there are two domains and, therefore, the management software executes both domains. The inputs are a server and target storage's ports which has been defined as redundant port on array from step 1007.

Figure 18:
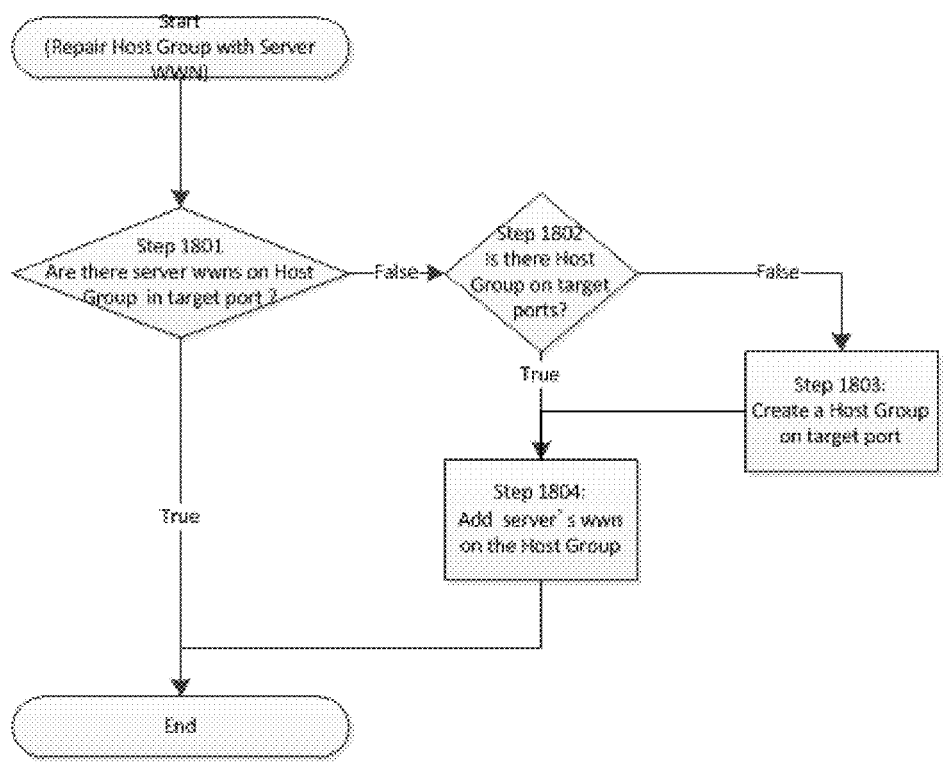
FIG. 18 shows an example of a flow diagram illustrating a process to repair Host Group or server WWNs for the Host Group in array's port.

In step 1201, the management software selects a server from the table of server configuration in FIG. 3. In step 1202, the management software gathers zone information from core FC-SW stored in FIG. 7 as zone configuration. In step 1203, the management software matches the server HBA port's WWN and storage's WWN with each zone having WWNs under each domain ID on each Fabric network. If the match fails, the process goes to step 1204. If there is a match, the process goes to step 1205. In step 1204, the management software executes repair zone process (steps 1210-1215). In step 1205, the management software gathers storage configuration information listed in FIG. 8. In step 1206, the management software checks the redundancy of host group on target array ports. If each target port has a host group with target server WWNs, the process goes to step 1208. If not, the process goes to step 1207. In step 1207, the management software repairs Host Group or server WWNs on target array's host group on the target port. Details of this step are shown in FIG. 18. In step 1208, the management software checks if this process is executed for all servers or not. If the process has been executed for all servers, the process ends. If not, the process goes to step 1201.

The repair zone process for server is illustrated in steps 1210-1215. The input is server and the target ports selected by the administrator. In step 1210, the management software matches server HBA port's WWN and storage port's WWN with zone having WWNs. If there is a match, the process ends. If the match fails, the process goes to step 1211. In step 1211, the management software matches server HBA port's WWN with zone having WWNs. If there is a match, the process goes to step 1212. If the match fails, the process goes to step 1213. In step 1212, the management software adds storage port's WWN to existence of zone, and the process ends. In step 1213, the management software matches storage port's WWN with zone having WWNs. If there is a match, the process goes to step 1214. If the match fails, the process goes to step 1215. In step 1214, the management software adds server HBA port's WWN to existence of zone, and the process ends. In step 1215, the management software creates a new zone with server HBA port's WWN and storage port's WWN, and the process ends.

FIG. 18 shows an example of a flow diagram illustrating a process to repair Host Group or server WWNs for the Host Group in array's port. This process is executed to each cluster storage subsystem. The input coming from management software is an array's port and server's WWNs.

In step 1801, the management software checks if there are server WWNs on Host Group in target array's port. If there are server WWNs on Host Group, the process ends. If not, the process goes to step 1802. In step 1802, the management software checks if there is host group for the server's port WWN in the array port. If yes, the process goes to step 1804. If not, the process goes to step 1803 and then step 1804. In step 1803, the management software requests the Storage Array to create a Host Group on target array's port. In step 1804, the management software requests the Storage Array to add server's WWN on the Host Group. The process ends.

2. Second Embodiment

The second embodiment involves N-port virtualization. The benefit of this embodiment is that the VM user can keep redundancy from the storage's port to VM considering redundant fabric networks under NPIV mapping to Raw Device. The second embodiment has similarities with the first embodiment. Only the differences from the first embodiment will be described. The physical configuration of FIG. 1 is applicable here.

Figure 13:
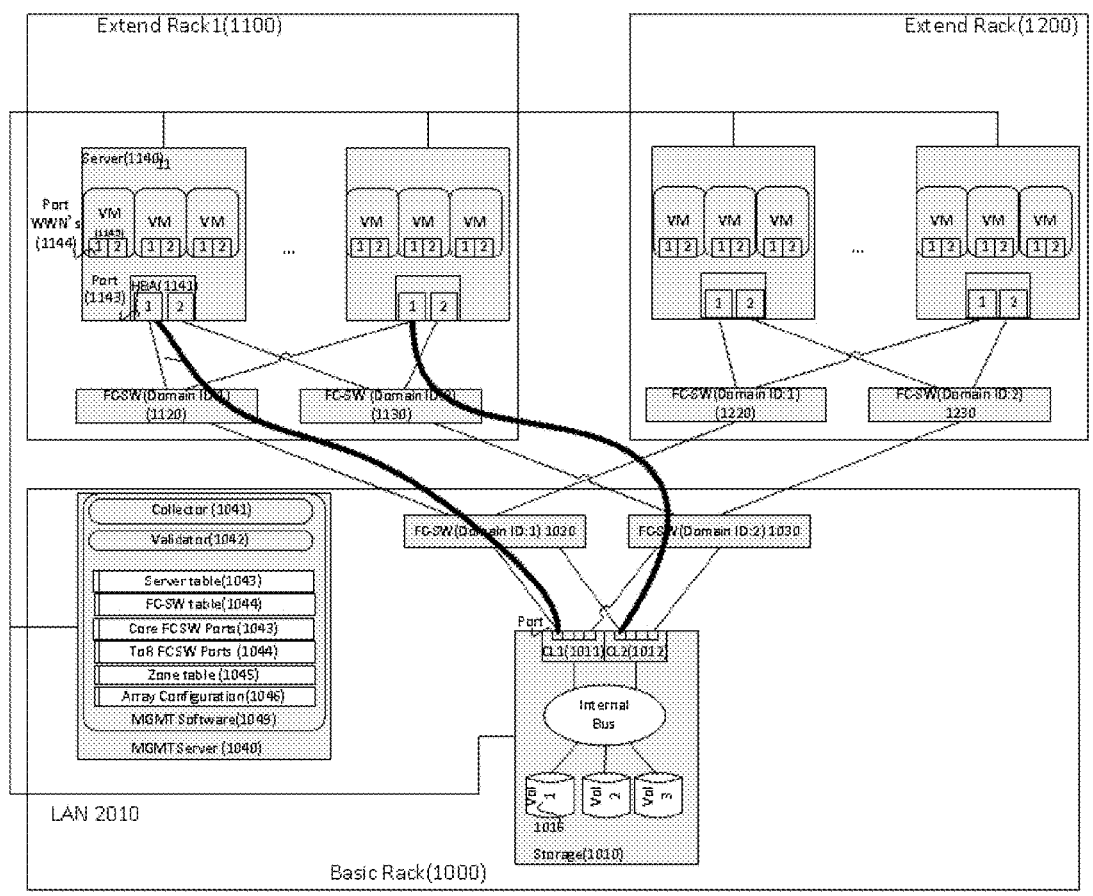
FIG. 13 shows an example of a logical configuration of the system of FIG. 1 from the storage's point of view according to the second embodiment.

FIG. 13 shows an example of a logical configuration of the system of FIG. 1 from the storage's point of view according to the second embodiment. As compared to the first embodiment of FIG. 2, the second embodiment adds VM 1145 and Node WWN and Port WWNs 1144 used by NPIV. As the result, the VM can directly access raw volume via Port WWN provided by the hypervisor. Added by VMs on hosts, one can retrieve VM's configuration information via WEBM, CIM, or some other kind of OS management I/F.

FIG. 14 shows an example of a table of collected VM configuration. The table includes columns of Name of VM, server UUID belonging VMs, NPIV's Port#, and NPIV's Port WWN. The NPIV's Node WWN may also be included in this table.

As a feature of NPIV, each VM can have virtually own Port WWN. Therefore, the Port configuration for Edge's FC-SW will have the port's WWN. FIG. 15 shows an example of a table of port configuration for Edge FC-SW according to the second embodiment. Port #1 is connected to a host which has VMs. One of the VMs has a virtual HBA port's WWNs. Those WWNs will be discovered on Edge FC-SW because Fabric-login was executed driver to Edge switch. As a result, Port #1 is shown with virtual HBA port's WWNs in the table of FIG. 15.

FIG. 16 shows an example of a table of zone list according to the second embodiment. When we create zoning using virtual HBA port's WWNs, we can use Zone list (FIG. 7) in first embodiment. For the second embodiment, a consideration point is to create a new zone with virtual HBA port's WWNs with storage port's WWN. Therefore an additional table of zone list as illustrated in FIG. 16 is provided to represent zones. The format of the table is the same as that of FIG. 7. Again, the difference is only the addition of zone for NPIV.

Regarding flow and behavior of the second embodiment, the difference as compared with the first embodiment is that the management software needs to create other zones for VMs as logical paths. The process is similar to that of the first embodiment shown in FIG. 9.

Figure 17:
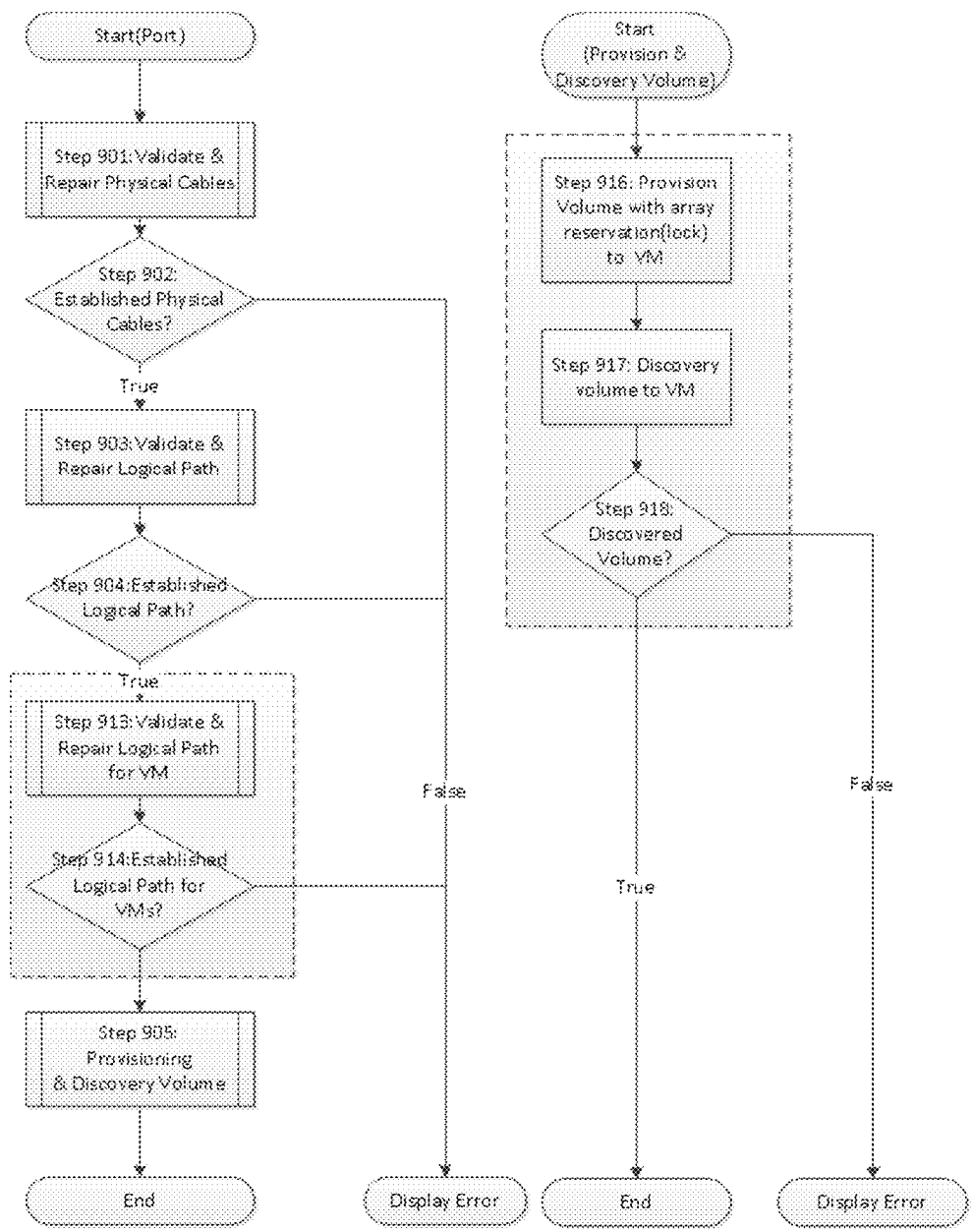
FIG. 17 shows an example of a flow diagram illustrating the volume provisioning process with validation considering NPIV according to the second embodiment.

FIG. 17 shows an example of a flow diagram illustrating the volume provisioning process with validation considering NPIV according to the second embodiment. FIG. 17 shows additional steps 913 and 914, and new steps 916-918 that replace steps 906-908 in FIG. 9. Step 913 is provided to validate and repair logical path for VMs. Details of this step are illustrated in FIG. 12. In this step, the management server uses server in the first embodiment. In the second embodiment, instead of the server, the management server uses VMs by referring to the table of VM configuration in FIG. 15 to create zone using NPIV's node and port WWN. Based on result of step 913, step 914 checks if the path has been logical paths as zones for a VM or not. Additionally, on volume provisioning in step 916 and step 917, the management software provisions volume against VM NPIV's WWN and indicates the VM to discover the provisioned volume. Step 918 will check the existence of volume on VM.

3. Third Embodiment

It is also difficult for server or virtual machine administrators to set up Ethernet networks taking into account of redundancy. The third embodiment discloses a method to validate and configure redundant Ethernet networks among servers where virtual machines run.

Figure 20A:
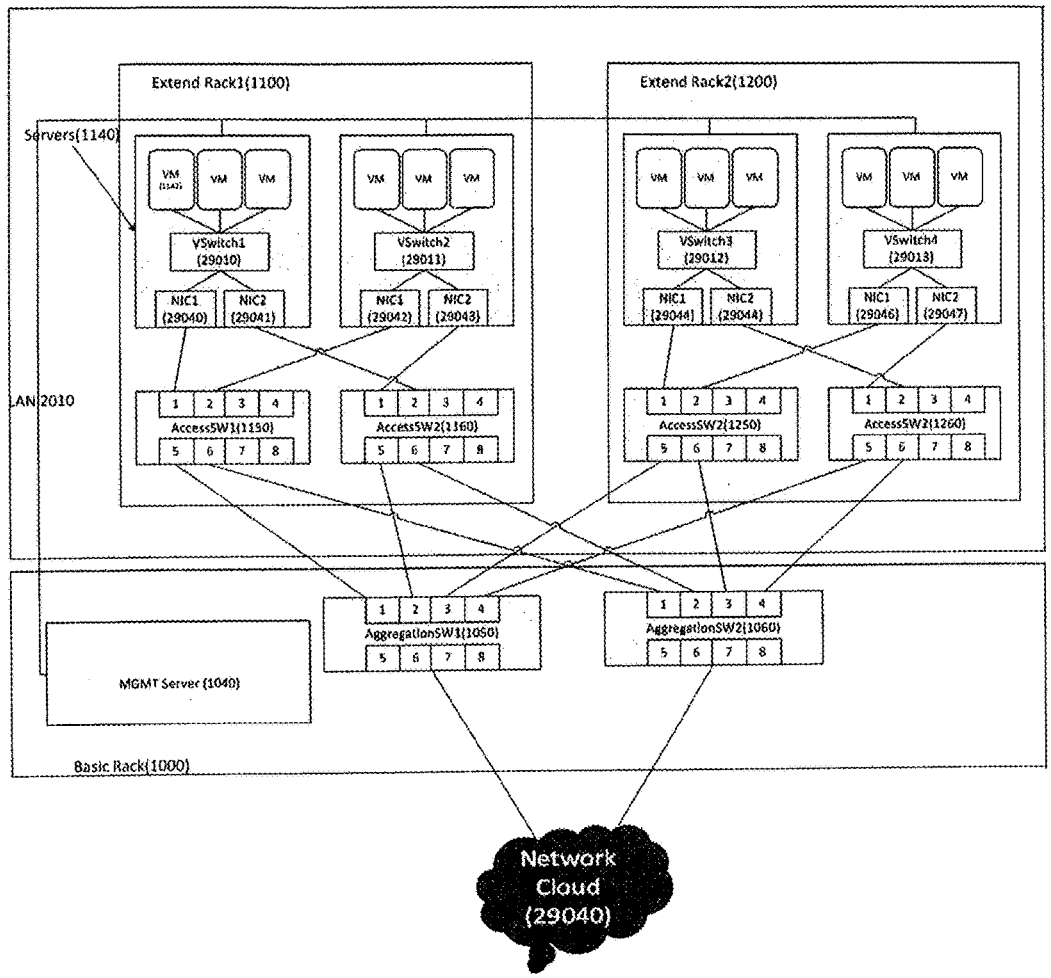
FIG. 20(a) shows an example of the logical configuration of the system of FIG. 1 from the Ethernet network's point of view according to the third embodiment.
Figure 20B:
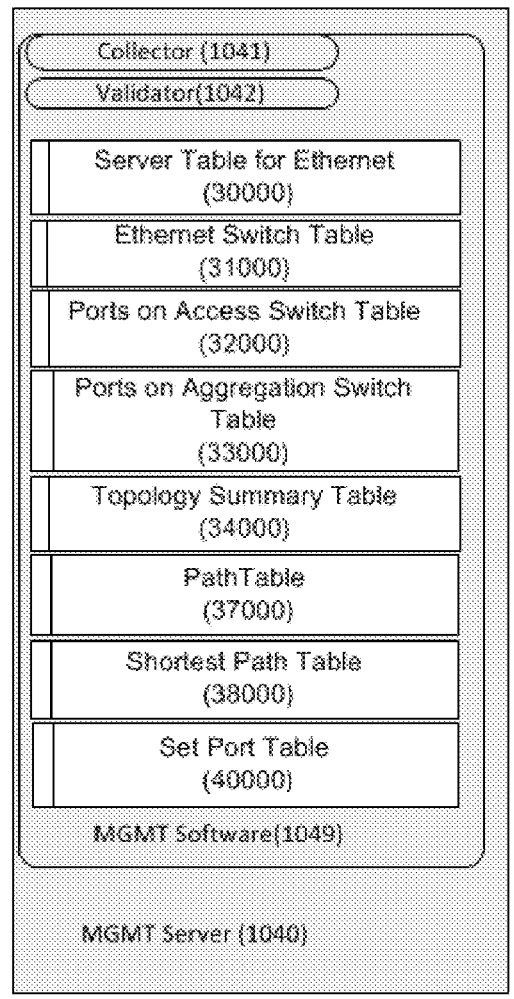
FIG. 20(b) shows details of the management server in FIG. 20(a).

FIG. 20(*a*) shows an example of the logical configuration of the system of FIG. 1 from the Ethernet network's point of view according to the third embodiment. The system includes Basic Rack 1000 and Extend Racks 1100, 1200. The Basic Rack 1000 is comprised of two Aggregation Switches 1050 and 1060 and a Management Server 1040. FIG. 20(*b*) shows details of the management server 1040 in FIG. 20(*a*). The management server 1040 has management software (MGMT software, 1049) to validate physical cables and logical paths. The software includes configuration info collector 1041 for servers and Ethernet switches information, validator 1042 for the physical cables and logical path, Server Table for Ethernet 30000, Ethernet Switch Table 31000, Ports on Access Switch Table 32000, Ports on Aggregation Switch Table 33000, Topology Summary Table 34000, Path Table 37000, Shortest Path Table 38000, and Set Port Table 40000. The management software has a capability to set VLAN (Virtual Local Area Network) IDs for each port of the Ethernet switches.

Access switches (1150, 1160, 1250, and 1260) are connected to Aggregation switches (1050 and 1060). VMs 1142 are connected to Virtual switches (29010-29013) and the virtual switches are connected to NICs (29040-29047). The NICs are connected to Access switches (1150, 1160, 1250, and 1260). Each Extend Rack is comprised of servers 1140 and Access switches (1150, 1160, 1250, and 1260). Each server has two NICs (29040-29047), a hypervisor (not shown in the figure) to run VMs, and VMs 1142. The VM may run an operating system such as Windows or Linux. The management server 1040 is connected to the servers 1140, access switches (1150, 1160, 1250, and 1260), and aggregation switches (1050 and 1060) via the LAN 2010.

FIG. 21 shows an example of a Server Table for Ethernet 30000. The table has columns of Name of server 30001, UUID 30002, IP address of the server 30003, virtual switches of servers 30004, NIC identifiers 30005, MAC Addresses of NICs 30006, and VLAN IDs which are set for the NICs or Virtual Switches 30004. UUID is universally unique identifier for a server in order to prohibit duplication of a server under distributed environment.

FIG. 22 shows an example of an Ethernet Switch Table 31000. The table includes columns of Names of Ethernet switches 31001, their IP Addresses 31002, and their Attribute 31003. Attribute can be "Access" or "Aggregation".

FIG. 23 shows an example of a Ports on Access Switch Table 32000. The table includes the Name of an Ethernet switch 31001, its IP Address 31002, and columns of its port identifiers 32001, discovered device IP addresses 32003, and discovered port identifiers 32004. Discovered device IP addresses 32003 and discovered port identifiers 32004 indicate devices and their port identifiers which are connected to the Ethernet switch 31001.

FIG. 24 shows an example of a Ports on Aggregation Switch Table 33000. The table includes the Name of an Ethernet switch 31001, its IP Address 31002, and columns of its port identifiers 33001, discovered device IP addresses 33003, and discovered port identifiers 33004. Discovered device IP addresses 33003 and discovered port identifiers 33004 indicate devices and their port identifiers which are connected to the Ethernet switch 31001.

FIG. 25 shows an example of a Topology Summary Table 34000. The table includes columns of Source Device IDs 34001, Source Device Ports 34002, Connected Device IDs 34003, and Connected Device Ports 34004. This table represents Switch Port to Switch Port connectivity and NIC to Switch Port connectivity. This table is created by using information on Tables 30000, 3100, 32000, and 33000.

Figure 26:
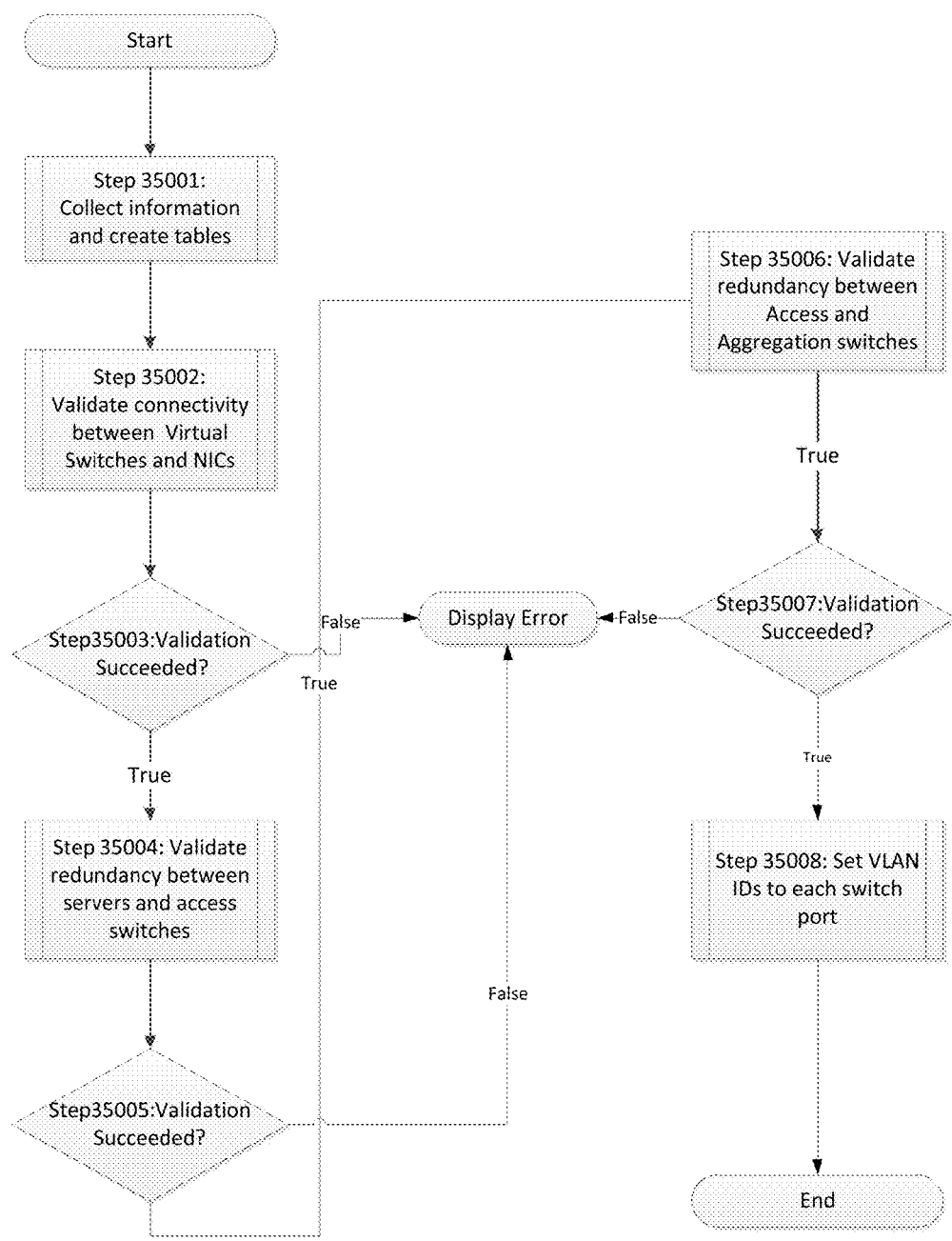
FIG. 26 shows an example of a flow diagram illustrating a process to validate and configure Ethernet network among servers.
Figures 30A, 30B:
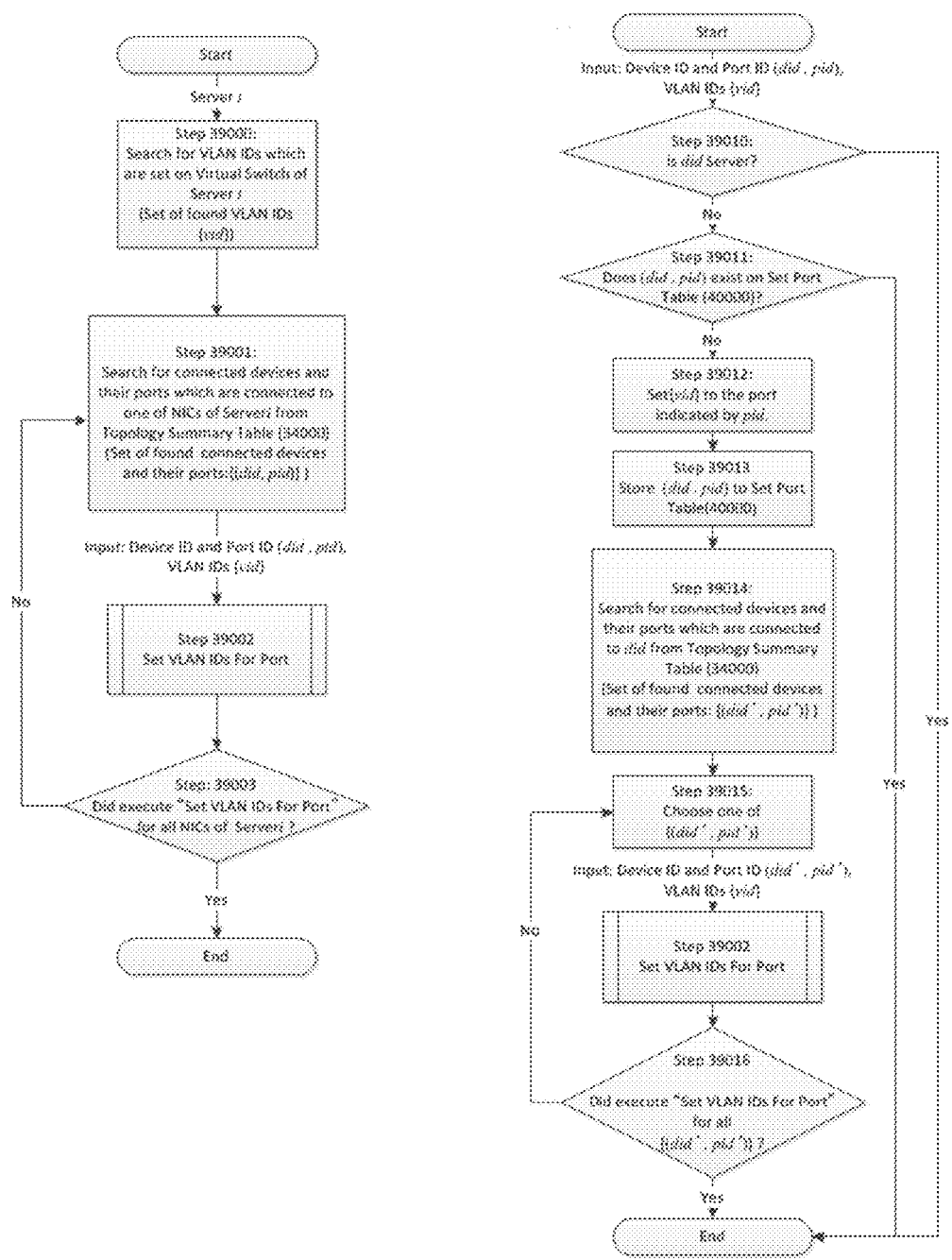
FIG. 30(a) shows an example of a flow diagram illustrating a process to set VLAN IDs to each switch port.
FIG. 30(b) shows an example of a flow diagram illustrating the detailed process of step 39002 to set VLAN IDs for Port in FIG. 30(a), with Device ID and Port ID {(did, pid)} and VLAN IDs {vid} as input.

FIG. 26 shows an example of a flow diagram illustrating a process to validate and configure Ethernet network among servers. This process will start when users dictate to validate and configure Ethernet network via MGMT Software 1049. In step 35001, the software collects information and creates tables as described above. In step 35002, the software validates connectivity between the virtual switches and NICs. In step 35003, the software determines whether the validation is successful. If the validation fails, the software displays error. If the validation is successful, the software validates redundancy between the servers and access switches in step 35004 (see FIG. 27). In step 35005, the software determines whether the validation is successful. If the validation fails, the software displays error. If the validation is successful, the software validates redundancy between the access and aggregation switches in step 35006 (see FIG. 32). In step 35007, the software determines whether the validation is successful. If the validation fails, the software displays error. If the validation is successful, the software sets VLAN IDs to each switch port in step 35008. Details of this step are shown in FIG. 30. The process ends.

Figure 27:
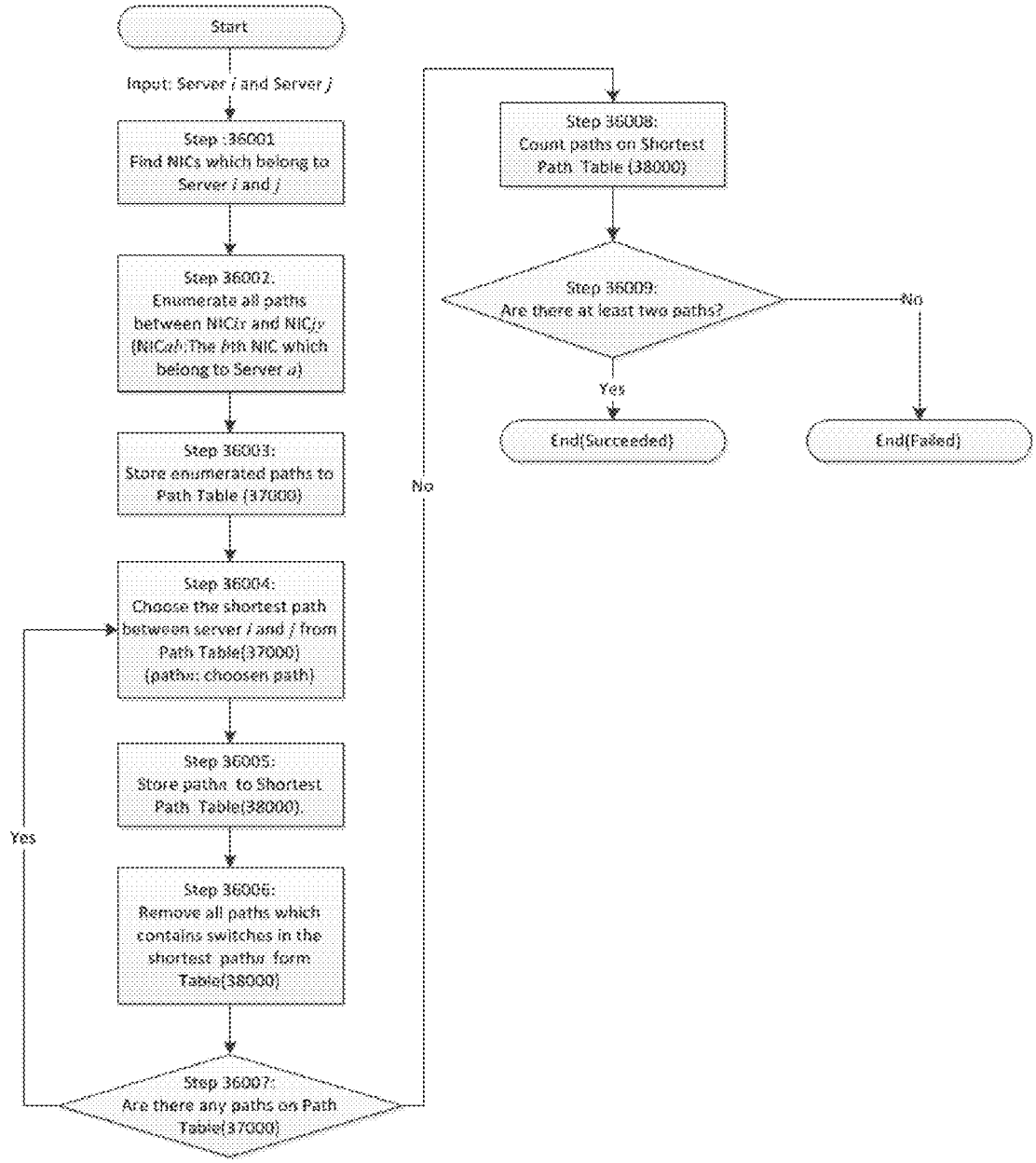
FIG. 27 shows an example of a flow diagram illustrating a process to validate redundancy of network between two servers.

FIG. 27 shows an example of a flow diagram illustrating a process to validate redundancy of network between two servers. This figure shows details of step 35004 in FIG. 26. The process starts with input from Server i and Server j. In step 36001, the software finds NICs which belong to Servers i and j. In step 36002, the software enumerates all paths between NICix and NICiy (NICab means the b-th NIC which belong to Server a). In step 36003, the software stores the enumerated paths to the path table 37000 (see FIG. 28). In step 36004, the software chooses the shortest path between Server i and Server j from the path table 37000 (path-n is the chosen path). In step 36005, the software stores path-n to the shortest path table 38000 (see FIG. 29) and remove the chosen path-n from the path table 37000. In step 36006, the software removes all paths which contain aggregation switches in the shortest path table 38000. In step 36007, the software determines whether there are any paths left in the path table 37000. If yes, the process returns to step 36004. If no, the software counts the number of paths in the shortest path table 38000 in step 36008. In step 36009, the software determines whether it has counted at least two paths. If yes, the validation ends with success. If no, the validation ends with failure.

FIG. 28 shows an example of a Path Table 37000. This Table is created and used during the process shown in FIG. 27. Path 37001 indicates end to end paths of Ethernet networks.

FIG. 29 shows an example of a Shortest Path Table 38000. This Table is created and used during the process shown in FIG. 27. Path 38001 indicates end to end paths of Ethernet networks. One calculates the number of paths between two servers by using this table.

FIG. 30(*a*) shows an example of a flow diagram illustrating a process to set VLAN IDs to each switch port. This process represents details of step 35008 in FIG. 26. In step 39000, the software searches for VLAN IDs which are set on virtual switch of Server i to form a set of found VLAN IDs {vid}. In step 39001, the software searches for connected devices and their ports which are connected to one of the NICs of Server i from the Topology Summary Table 34000 (FIG. 25), to form a set of found connected devices and their ports {(did, pid)}. With Device ID and Port ID {(did, pid)} and VLAN IDs {vid} as input, the software sets VLAN IDs for Port in step 39002. Details of this step are shown in FIG. 30(*b*). In step 39003, if the software has executed "Set VLAN IDs for Port" for all NICs of Server i, the process ends; otherwise, the process returns to step 39001.

FIG. 30(*b*) shows an example of a flow diagram illustrating the detailed process of step 39002 to set VLAN IDs for Port in FIG. 30(*a*), with Device ID and Port ID {(did, pid)} and VLAN IDs {vid} as input. In step 39010, the software determines whether the connected device (did) is Server. If yes, the process ends. If no, the software determines whether {(did, pid)} exists on the Set Port Table 40000 (see FIG. 31) in step 39011. If yes, the process ends. If no, the software sets {vid} to the port indicated by pid in step 39012. During step 39012, the Collector 1041 is used to get VLAN IDs which are set on the port identified by pid. The MGMT Software 1049 chooses VLAN IDs which are not set on the port from {vid} and sets chosen IDs to the port.

In step 39013, the software stores {(did, pid)} to the Set Port Table 40000. In step 39014, the software searches for connected devices and their ports which are connected to (did) from the Topology Summary Table 34000 (FIG. 25), to obtain a set of found connected devices and their ports {(did', pid')}. In step 39015, the software chooses one of {(did', pid')}. With Device ID and Port ID {(did, pid)} and VLAN IDs {vid} as input, the software sets VLAN IDs for Port in step 39002. In step 39016, if "Set VLAN IDs for Port" has been executed for all {(did', pid')}, the process ends; otherwise, the process returns to step 39015. Steps 39015 and 39002 in FIG. 30(*b*) indicate recursive processing of "Set VLAN IDs for Port".

Step 39002 in FIG. 30(*b*) indicates a recursive nature of the process of setting VLANs. To configure all the relevant ports in the network, the procedure needs to go from one switch to its connected switches and so on, and at each switch the procedure will repeat all the steps of FIG. 30(*b*). Step 39012 in FIG. 30(*b*) is the step that actually sets VLAN on the port. The remaining steps in FIG. 30(*b*) are to discover if more devices are connected to the device on which VLAN needed to be configured. As such, after step 39014 and before step 39015, the software will check if any port is available to select; if yes, the process continues to step 39015; if no, the process ends.

FIG. 31 shows an example of a Set Port Table 40000. This table is created and used during the process shown in FIG. 30. The Device ID 40001 indicates IP Addresses of Server and Ethernet switches. The Device Port 40002 indicates identifiers of ports of Ethernet switches and NICs.

Figure 32:
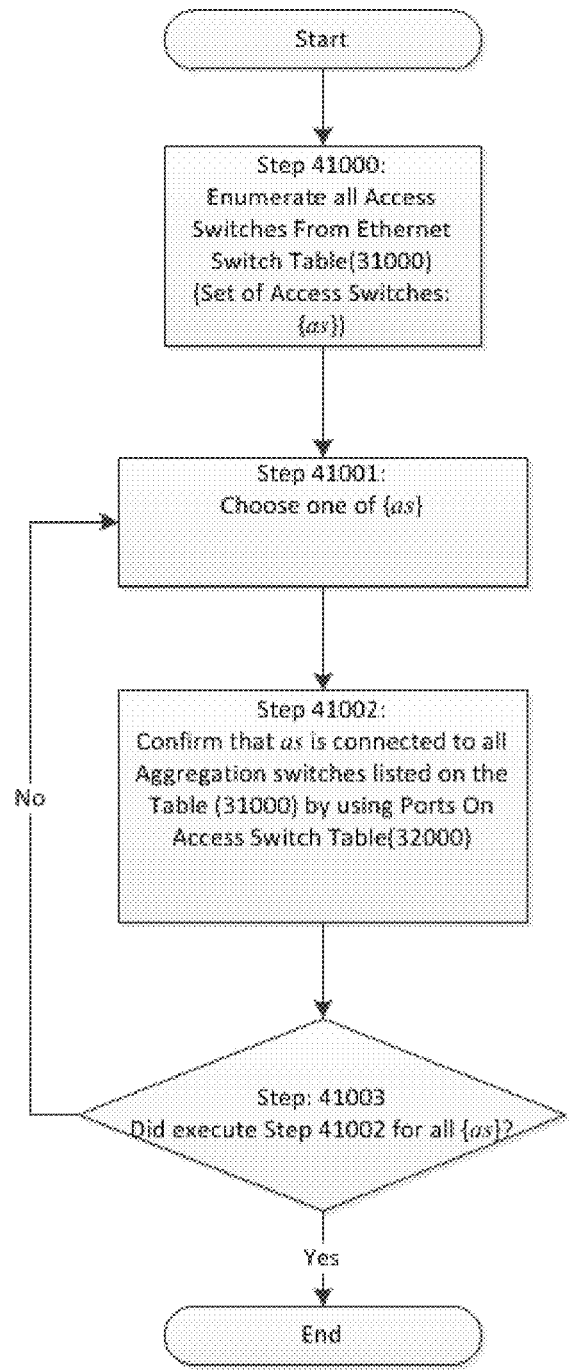
FIG. 32 shows an example of a flow diagram illustrating the detailed process of step 35006 to validate redundancy between and access and aggregation switches shown in FIG. 26.

FIG. 32 shows an example of a flow diagram illustrating the detailed process of step 35006 to validate redundancy between and access and aggregation switches shown in FIG. 26. In step 41000, the software enumerates all access switches from the Ethernet Switch Table 31000 (FIG. 22) to form a set of access switches {as}. In step 41001, the software chooses one of the access switches in {as}. In step 41002, the software confirms that the chosen access switch is connected to all aggregation switches listed on the Ethernet Switch Table 31000 by using the Ports on Access Switch Table 32000 (FIG. 23). In step 41003, if step 41002 has been executed for all access switches in {as}, the process ends; otherwise, the process returns to step 41001.

Of course, the system configuration illustrated in FIG. 1 is purely exemplary of information systems in which the present invention may be implemented, and the invention is not limited to a particular hardware configuration. The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

From the foregoing, it will be apparent that the invention provides methods, apparatuses and programs stored on computer readable media for redundant path validation before provisioning volume. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. A computer comprising a memory storing a software and a processor executing the software, wherein the software is operable to:

receive an identification of storage ports of a storage system corresponding to a volume to be provisioned;

check, in response of receiving the identification of the storage ports, whether a redundant relationship is formed by a first physical connection between a first server port of a plurality of servers and a first storage port of the identified storage ports of the storage system and a second physical connection between a second server port of the plurality of servers and a second storage port of the identified storage ports of the storage system to validate the first and second physical connections;

after validating the redundant relationship of the first and second physical connections, gather preset zone information showing correspondence between zones and WWNs of server ports of the plurality of servers and storage ports of the storage system for each Domain ID of each corresponding FC-SW;

check whether a redundant relationship is formed by a first logical connection between the first server port and the first storage port by matching a WWN of the first server port and a WWN of the first storage port with gathered WWNs of the server ports and the storage ports corresponding to the zone for each Domain ID and a second logical connection between the second server port and the second storage port by matching a WWN of the second server port and a WWN of the second storage port with gathered WWNs of the server ports and the storage ports corresponding to the zone for each Domain ID, to validate the first and second logical connections;

gather storage information showing correspondence between the storage port, a host group and WWNs of server ports;

check whether each of the first and second storage ports has a host group with the WWNs of the first and second server ports by using the gathered storage information to determine whether the storage system has host group redundancy in validating the first and second logical connections; and provision the volume from the storage system after validating the redundant relationship of the first and second logical connections.

2. The computer according to claim 1, wherein if the software does not validate the redundant relationship of the first and second logical connections, the software is operable to repair one or both of the first and second logical connections by repairing zones by:

adding the WWN of the first or second storage port to a zone having the WWN of the first or second server port;

adding the WWN of the first or second server port to a zone having the WWN of the first or second storage port; or creating a zone having the WWN of the first or second server ports and the WWN of the first or second storage ports.

3. The computer according to claim 1, wherein the software is operable to:

create a host group with the WWNs of the first and second server ports or add the first or second server port on the host group, when the first or second storage port does not have a host group with the WWNs of the first and second server ports as a result of the check.

4. A non-transitory computer-readable storage medium storing a plurality of instructions for controlling a processor to validate redundant paths, the plurality of instructions comprising:

instructions that cause the processor to receive an identification of storage ports of a storage system corresponding to a volume to be provisioned;

instructions that cause the processor to check, in response of receiving the identification of the storage ports, whether a redundant relationship is formed by a first physical connection between a first server port of a plurality of servers and a first storage port of the identified storage ports of the storage system and a second physical connection between a second server port of the plurality of servers and a second storage port of the identified storage ports of the storage system to validate the first and second physical connections;

instructions that cause the processor to, after validating the redundant relationship of the first and second physical connections, gather preset zone information showing correspondence between zones and WWNs of server ports of the plurality of servers and storage ports of the storage system for each Domain ID of each corresponding FC-SW;

instructions that cause the processor to check whether a redundant relationship is formed by a first logical connection between the first server port and the first storage port by matching a WWN of the first server port and a WWN of the first storage port with gathered WWNs of the server ports and the storage ports corresponding to the zone for each Domain ID and a second logical connection between the second server port and the second storage port by matching a WWN of the second server port and a WWN of the second storage port with gathered WWNs of the server ports and the storage ports corresponding to the zone for each Domain ID, to validate the first and second logical connections;

instructions that cause the processor to gather storage information showing correspondence between the storage port, a host group and WWNs of server ports;

instructions that cause the processor to check whether each of the first and second storage ports has a host group with the WWNs of the first and second server ports by using the gathered storage information to determine whether the storage system has host group redundancy in validating the first and second logical connections; and instructions that cause the processor to provision the volume from the storage system after validating the redundant relationship of the first and second logical connections.

5. The non-transitory computer-readable storage medium according to claim 4, instructions that cause the processor to, if the processor does not validate the redundant relationship of the first and second logical connections, repair one or both of the first and second logical connections by repairing zones by:

adding the WWN of the first or second storage port to a zone having the WWN of the first or second server port;

adding the WWN of the first or second server port to a zone having the WWN of the first or second storage port; or creating a zone having the WWN of the first or second server ports and the WWN of the first or second storage ports.

6. The non-transitory computer-readable storage medium according to claim 4, wherein the plurality of instructions comprise:

instructions that cause the processor to create a host group with the WWNs of the first and second server ports or add the first or second server port on the host group, when the first or second storage port does not have a host group with the WWNs of the first and second server pods as a result of the check.

* * * * *